US012791910B1

(12) United States Patent
Yi et al.

(10) Patent No.: US 12,791,910 B1
(45) Date of Patent: Nov. 10, 2026

(54) CLUSTER-STATE GENERATION WITH ON-CHIP CONTINUOUS-VARIABLE QUANTUM FREQUENCY COMBS

(71) Applicants: Xu Yi, Charlottesville, VA (US); Olivier Pfister, Charlottesville, VA (US); Zijiao Yang, Charlottesville, VA (US); Mandana Jahanbozorgi, Charlottesville, VA (US)

(72) Inventors: Xu Yi, Charlottesville, VA (US); Olivier Pfister, Charlottesville, VA (US); Zijiao Yang, Charlottesville, VA (US); Mandana Jahanbozorgi, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 378 days.

(21) Appl. No.: 18/536,563

(22) Filed: Dec. 12, 2023

Related U.S. Application Data

(60) Provisional application No. 63/432,260, filed on Dec. 13, 2022.

(51) Int. Cl.
*G02F 1/35* (2006.01)
*G02F 1/365* (2006.01)

(52) U.S. Cl.
CPC .............. *G02F 1/365* (2013.01); *G02F 1/353* (2013.01); *G02F 2203/56* (2013.01)

(58) Field of Classification Search
CPC ....... G02F 1/353; G02F 1/365; G02F 2203/56
See application file for complete search history.

(56) References Cited

U.S. PATENT DOCUMENTS

| | | | | |
|---|---|---|---|---|
| 9,459,101 | B1 * | 10/2016 | Strandjord | G01C 19/72 |
| 10,466,418 | B2 * | 11/2019 | Fanto | G02F 1/225 |
| 11,429,010 | B1 * | 8/2022 | Puckett | G02F 1/113 |
| 11,586,094 | B2 * | 2/2023 | Fertig | G02F 1/365 |
| 12,218,483 | B2 * | 2/2025 | Puckett | H01S 3/1307 |
| 12,254,381 | B1 * | 3/2025 | Alexander | G06N 10/40 |
| 12,504,668 | B2 * | 12/2025 | Stern | G02F 1/3536 |
| 2016/0204571 | A1 * | 7/2016 | Wu | H01S 3/302 359/334 |
| 2023/0040798 | A1 * | 2/2023 | Kono | H01S 5/2226 |
| 2024/0184041 | A1 * | 6/2024 | Blumenthal | G02B 6/1225 |

OTHER PUBLICATIONS

Nehra et al., Photon-number-resolving segmented detectors based on single-photon avalanche-photodiodes. Optics Express. Feb. 3, 2020;28(3):3660-75.

Yu et al., Segmented waveguide photodetector with 90% quantum efficiency. Optics Express. May 14, 2018;26(10):12499-505.

* cited by examiner

*Primary Examiner* — Ryan A Lepisto
(74) *Attorney, Agent, or Firm* — Wolf, Greenfield & Sacks, P.C.

(57) ABSTRACT

Quantum photonic devices are disclosed for generating light having a continuous variable (CV) cluster state by interfering two-mode squeezed frequency combs using an optical coupler. Some embodiments use pump lights having different wavelengths and circulating as two counterpropagating modes of an optical microresonator to generate the two-mode squeezed frequency combs via a nonlinear optical interaction. Some embodiments use pump lights having different wavelengths propagating inside two separate optical waveguides to generate the two-mode squeezed frequency combs via parametric optical amplification.

24 Claims, 11 Drawing Sheets

CLUSTER-STATE GENERATION WITH ON-CHIP CONTINUOUS-VARIABLE QUANTUM FREQUENCY COMBS

INCORPORATION BY REFERENCE TO ANY PRIORITY APPLICATIONS

This application claims the benefit of priority of U.S. Provisional Application No. 63/432,260, titled CLUSTER-STATE GENERATION WITH ON-CHIP CONTINUOUS-VARIABLE QUANTUM FREQUENCY COMBS, filed Dec. 13, 2022, the entire disclosure of which is incorporated herein by reference.

FEDERALLY SPONSORED RESEARCH

This invention was made with government support under Grant No. 1842641 awarded by the National Science Foundation. The government has certain rights in the invention.

BACKGROUND

Field

This disclosure relates to devices and methods for generating continuous-variable (CV) cluster states and to use of integrated photonic devices and circuits in such devices and methods.

Description of Related Art

Continuous variable (CV) cluster-states can serve as the foundation for scalable optical measurement-based quantum computing. Quantum optical devices and circuits can provide a platform for generating photonic CV cluster-states for optical quantum computation and information processing. Quantum optical devices and circuits that generate photonic CV cluster-states devices can be implemented on chip-scale integrated photonics platforms that allow fabrication of thousands of integrated optical components using existing semiconductor fabrication processes.

SUMMARY

In one aspect, a quantum photonic device generates light having a continuous variable (CV) cluster state. The quantum photonic device can include: an optical microresonator; at least one light source configured to generate light having a first wavelength and light having a second wavelength different from the first wavelength; at least one optical coupler configured to couple at least a portion of the light having the first wavelength to a first optical mode of the optical microresonator and at least a portion of the light having the second wavelength to a second optical mode of the optical microresonator; and a directional optical coupler. The directional optical coupler can be configured to receive, via at least one output waveguide, a portion of nonlinearly generated light produced by the first optical mode and a portion of nonlinearly generated light produced by light in the second optical mode from the optical microresonator and to output the light having the CV cluster state.

In another aspect, a quantum photonic device generates a continuous variable cluster state. The quantum photonic device can include: at least one light source configured to generate light having a first frequency and light having a second frequency different from the first frequency; a first waveguide configured to use the light having the first frequency to generate a first optical output via a first nonlinear optical effect; a second waveguide configured to use the light having the second frequency to generate a second optical output via a second nonlinear optical effect; and a directional optical coupler configured to use first and the second optical outputs to generate the continuous variable cluster state.

BRIEF DESCRIPTION OF THE DRAWINGS

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

DETAILED DESCRIPTION

I. Overview

Figure 1A:
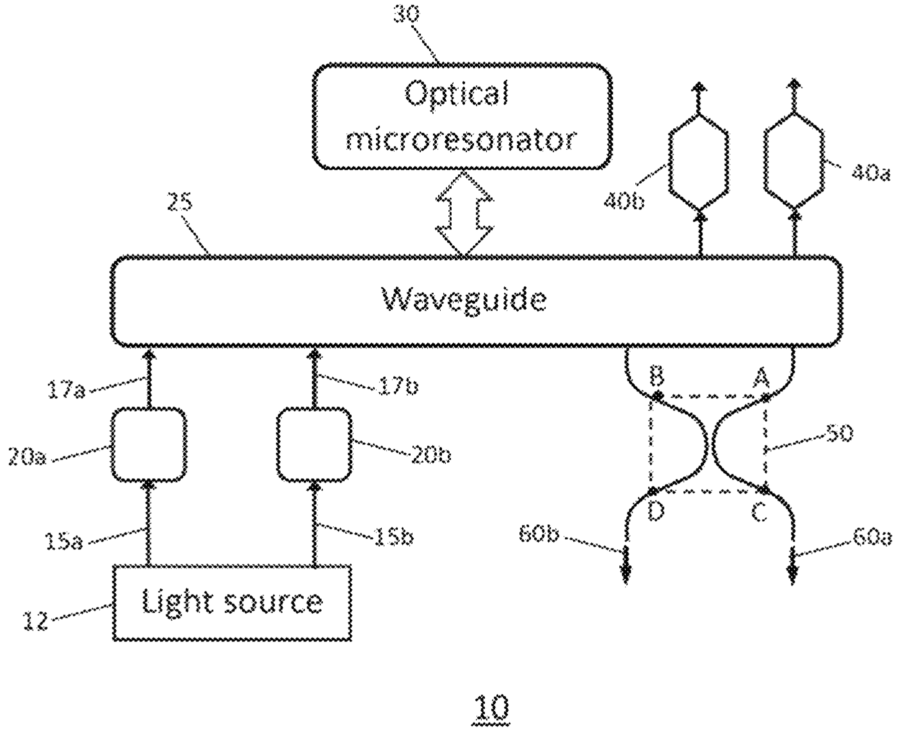
FIG. 1A is a diagram illustrating a quantum optical device configuration for generating a photonic CV cluster state using optical resonance and nonlinear optical interaction in an optical microcavity.

Described herein are devices and methods to generate continuous-variable (CV) cluster-states using integrated photonic circuits. In some implementations, the CV cluster-states serve as the foundation for scalable optical measurement-based quantum computing. Quantum optics provide a scalable platform for quantum information processing through CV encoding and multiplexing, whether in time, frequency, or space. However, for optical quantum information processing to become a commercial reality, these platforms need to be miniaturized to chip-scale integrated photonics, so that thousands of optical components can be integrated and fabricated with semiconductor fabrication processes.

The inventors have recognized and appreciated that conventional chip-scale devices for the generation of CV cluster-states are susceptible to non-uniformities arising due to the fabrication processes. Some of these devices operate based on resonant wavelengths of optical resonators and as a result rely on optical components to be strictly identical to one another. The slightest variation in the fabrication process can cause resonant wavelengths to shift, thus negatively affecting the operation of the device. For example, the resonant wavelengths and the free-spectral-ranges of integrated photonic resonators—which are lithographical patterned and fabricated—may be highly sensitive to small variations in a dimension (e.g., diameter) of the resonator. In some cases, such integrated photonic resonators may not provide sufficient tuning capability with respect to the free-spectral-range (FSR) of the resonator. As a result, the frequency spacing of a frequency comb (also referred to as comb spacing) generated by the resonator may not be sufficiently adjustable after fabrication or controlled during operation to compensate for fabrication uncertainties. It is therefore challenging to align the frequencies of multiple two-mode squeezed optical frequency combs generated by such resonators (e.g., generated by two individual resonators) to generate cluster states by interfering them. In some embodiments, a two-mode squeezed optical frequency comb comprises a plurality of entangled photon pairs having different frequencies and each photon pair being in a two-mode squeezed state. The performance of some of the devices and configurations developed by the inventors and described herein can be less susceptible to fabrication non-uniformities compared to existing devices and configurations used to generate photonic CV cluster states. In some embodiments, the disclosed devices and configurations may generate multiple two-mode squeezed optical frequency combs where the comb spacing of individual frequency combs can be inherently identical independent of minor variations in a device dimension, thus enabling cluster state generation via quantum interference. This, in turn, can be achieved using at least two alternative methods disclosed herein. The first method includes coupling pump light (e.g., light wave or light beam) to two counter-propagating optical modes in a single resonator (e.g., a microresonator) to generate two frequency combs via nonlinear optical interaction inside the resonator. In some cases, (e.g., when the resonator supports a single radial mode), the two counter-propagating modes in the same resonator, may generate two optical frequency combs (e.g., two squeezed optical frequency combs) having frequency alignments suitable for generating a cluster state. The second method includes generating multiple two-mode squeezed optical frequency combs in two or more optical waveguides using a nonlinear optical effect or interaction (e.g., parametric amplification or parametric down-conversion). In some cases, at least one of the optical waveguides (also referred to as waveguides) may not support any resonant optical mode (e.g., a longitudinal resonant optical mode). Such a waveguide may be referred to as a "non-resonant waveguide." In some examples, a waveguide, used to generate the optical frequency comb, may comprise a nonlinear region within which the optical frequency comb may be generated via the nonlinear optical effect or interaction. The nonlinear region may comprise a material having a large nonlinear optical coefficient (also referred to as a nonlinear optical material). In some cases, the nonlinear optical material may comprise a material having a non-zero third-order nonlinear optical susceptibility, $\chi^{(3)}$, and/or a non-zero second-order nonlinear optical susceptibility, $\chi^{(2)}$, to support a parametric optical process. In some examples, the nonlinear optical material can have a Kerr nonlinear coefficient (or third-order nonlinear optical susceptibility, $\chi^{(3)}$) larger than $10^{-20}$ m$^2$/W. In some cases, the nonlinear region may comprise periodically poled region. In these examples, the comb spacing of the resulting optical frequency combs may be determined by the frequencies or difference between the frequencies of the two pump light waves or beams that are provided to individual waveguides and generate the optical frequency combs upon interaction (e.g., nonlinear optical interaction) with the corresponding nonlinear regions.

In some cases, the pump light waves (or beams) may have different frequencies (or wavelengths) and may be generated by individual laser sources. In some examples, the individual laser sources can be phase locked. In some cases, the pump light waves or beams, may be generated by a single laser. For example, a first portion of the light generated by the single laser may serve as a first pump light and an optical frequency shifter may be used to shift the remaining portion of light generated by the laser to generate a second pump light having a frequency different from that of the light emitted by the laser. In some other examples, the pump light waves or beams, may be generated by a laser source and an electro-optical modulator that is configured to shift at least a portion of light generated by the laser source.

In some embodiments, entangled pair generation in accordance with the present disclosure may be based on nonlinear optical interaction in an integrated high-quality factor (high-Q) optical microresonator having thousands of resonance modes with their frequencies separated by the resonator's free-spectral-range (FSR). When a microresonator is pumped by a continuous-wave laser light (also referred to as pump laser), the nonlinear optical interaction between the laser light and the microresonator may generate broadband parametric gain that may convert a pair of pump photons into signal and idler photons at lower and higher frequency modes of the microresonator. The signal and idler photons may be non-classically correlated. This non-classical correlation may create two-mode vacuum squeezing and thus unconditional Einstein-Podolsky-Rosen (EPR) entanglement of the optical quadrature fields between the two resonant modes n and −n, where n and −n are the mode orders representing a frequency distance between the resonant modes excited by the signal and idler photons and having larger or smaller frequencies respectively). For EPR entanglement states, the variance of the measured nullifiers may be smaller than that of the vacuum state and may be, for example, 3 dB below that of the vacuum state for genuine entanglement. The number of quantum modes that can be generated in a microresonator via Kerr effect may ultimately be limited by chromatic dispersion and Raman scattering in the microresonator.

The two-mode entanglement in squeezed quantum microcombs may subsequently be turned into multipartite entanglement through quantum interference. In some embodiments described herein, two squeezed microcombs with substantially identical comb spacing can be simultaneously generated by a single microresonator (e.g., an on-chip microresonator) when microresonator is optically pumped by two optical pump sources (e.g., two lasers). In some implementations, the frequencies of the pump lasers are offset by the comb spacing and/or the FSR (or, more generally, an integer multiple of the FSR) of the microresonator that generates the optical frequency combs. In some such implementations, the first microcomb may comprise entangled pairs of (−2,2), (−4,4), (−6,6) and etc., while the second microcomb may comprise entangled qumodes (−2, 4), (−4,6), (−6,8) and etc. In some embodiments, the two microcombs may be combined or interfered using an optical coupler (e.g., a directional optical coupler) to generate a cluster state. In some cases, the directional optical couple can have a splitting ratio of 50/50. In some examples, the modes of the microcombs having the same comb spacing can experience quantum interference (e.g., CV version of the Hong-Ou-Mandel effect), when fed to two input ports of the directional optical coupler. Quantum interference may entangle the modes of the two microcombs and the two entangled microcombs are output via the two output ports of the directional optical coupler. This effectively entangles the squeezed pairs of the individual frequency combs and generates a 1-dimension (1D) cluster-state, where each quantum mode is entangled with two of its neighbors.

II. Counter-Pumped Microresonator Configuration

The first approach involves use of counter-propagating optical modes in a microresonator to generate two squeezed frequency combs for the cluster-state generation. In a microresonator, light (e.g., an optical mode) can propagate in both clockwise and counterclockwise directions, and the optical modes propagating in these two directions are degenerate (e.g., have the same frequencies). In some embodiments, coupling a first pump light to a mode of microresonator propagating in the counterclockwise direction generates a first squeezed microcomb (frequency comb) propagating in the counterclockwise direction and coupling a second pump light to a mode of microresonator propagating in the clockwise direction generates a second squeezed microcomb (frequency comb) propagating in the clockwise direction where the first and the second frequency combs have identical or near identical frequency spectrums or at least the same comb spacing. In some case, the frequency of the first pump light that is coupled to the optical mode that propagates in the clockwise direction may be offset with respect to the frequency of the second pump light that is coupled to the optical mode that propagates in the counterclockwise direction inside the microresonator, by one or multiple FSR of the microresonator. In some embodiments, the two squeezed microcombs may be interfered with each other using an optical coupler (e.g., a directional optical coupler) to generate a 1-D cluster state. The benefit of using counter-propagating configuration is that the frequencies of the two squeezed quantum frequency combs are naturally aligned such that their quantum interference generates a 1-D CV cluster state. In some cases, the resulting 1-D CV cluster state may comprise a dual-rail cluster state.

FIG. 1A is a diagram illustrating a quantum optical (or quantum photonic) device configuration 10 for generating a photonic CV cluster state using optical resonance and nonlinear optical interaction in an optical microresonator 30 (also referred to as microresonator 30). In some embodiments, the quantum optical device configuration 10 comprises a light source 12 (e.g., a laser light source), an optical microresonator 30, at least one waveguide 25, and an output optical coupler 50. In some implementations, the optical microresonator 30 and the at least one waveguide 25 can be fabricated (e.g., monolithically) on a single chip or substrate. In some cases, some components of the optical device configuration 10 may be fabricated on a first chip and some other components may be fabricated on a second chip where the first and the second chips are optically connected using free space optical arrangements (e.g., one or more lenses), optical fibers, or photonic wire bonds. For example, the light source 12 may be fabricated on a chip separate from another chip on which the optical microresonator 30, the at least one waveguide 24, and the output optical coupler 50 are fabricated.

In some embodiments, the light source 12 outputs a first pump light 15*a* having a first frequency (or wavelength) and a pump light 15*b* having a second frequency (or wavelength) different from the first frequency. In some examples, the frequency spacing or difference (or wavelength spacing) between the first and the second frequencies (wavelengths) can be equal to m×FSR, where FSR is the free-spectral-range of the microresonator 30, and m is a non-zero integer number. In some cases, the first pump light 15*a* is coupled to a first mode of the microresonator 30 and the second pump light 15*b* is coupled to a second mode of the microresonator 30, via the at least one waveguide 25. In some examples, the first mode can be a clockwise mode circulating in the microresonator 30 in the clockwise direction and the second mode can be a counterclockwise mode circulating in the microresonator 30 in the counterclockwise direction. In some examples, the at least one waveguide 25 is configured to evanescently couple the first and second pump lights to the first and second modes of the microresonator 30 respectively.

In some cases, nonlinear optical interactions between the light coupled to the first and second modes of the microresonator 30 generate a first frequency comb and a second frequency comb different from the first frequency comb. In some examples, the nonlinear optical interactions may comprise one or more of the four-wave mixing. In some embodiments, the at least one waveguide may be configured to couple the first frequency comb and the second frequency comb to the at least one waveguide 25.

In some case, the at least one waveguide 25 may direct first frequency comb and a second frequency comb to a first input port A and a second input port B of the output optical coupler 50 (e.g., a directional optical coupler), respectively. In some embodiments, the output optical coupler 50 may interfere the first and second frequency combs by outputting a portion of optical power received from the first input port and a portion of optical power received from the second input port via a first output port C and the remaining portions via a second output port D. In some cases, light beams 60*a* and 60*b* output by the first and second output ports, C and D of the output optical coupler 120 may comprise a CV cluster state (e.g., a dual-rail cluster state).

In some embodiments a first optical coupler 20*a* may be used to couple the first pump light 15*a* to the at least one waveguide 25 and a second optical coupler 20*a* may be used to couple the second pump light 15*b* to the at least one waveguide 25. In some cases, the first and second optical couplers 20*a*, 20*b*, may be configured such that after coupling the first and second pump lights 15*a*, 15*b*, travel in the at least one waveguide 25 in opposite directions.

In some embodiments, the light source may comprise a first laser that generates the first pump light 15*a* having a first frequency (or wavelength) and a second laser that generated the second pump light 15*b* having a second frequency (or wavelength). In some embodiments the first and the second lasers can be phase locked or otherwise configured to generate light beams having some degree of phase correlation. In some embodiments, the light source 12 may comprise a single laser that generate laser light having the first frequency and an optical frequency shifter configured to generate or derive light having the second frequency using the light having the first frequency. For example, a portion of the laser light may be output by the light source 12 as the first pump light 15*a*, and the second portion of the laser light may be provided to the optical frequency shifter that converts the second portion of the laser light to light having the second frequency and outputs the second pump light 15*b*.

In some implementations, the microresonator 30 may comprise a microring resonator, a racetrack microresonator, or other types of optical microresonator that support at least two modes that can generate frequency combs having identical or nearly identical frequency spacings. In some implementations, the at least one waveguide 25 may comprise a ridge waveguide, a buried waveguide, or other types of integrated waveguides. In some implementations, the direction optical coupler 50 may comprise an optical component having two input ports and two output ports where each output port outputs a portion of light received by the first input port and a portion of light received by the second input port. In some examples, the direction coupler may have a splitting ratio of 50/50, 49/51, 48/52, 47/53 or any splitting ratio between these values.

In some embodiments, the quantum optical device configuration 10 may further include a first optical coupler 40*b* configured to couple light having the first frequency (or first wavelength) out of the at least one waveguide 25 and a second optical coupler 40*b* configured to couple light having the second frequency (or second wavelength) out of the at least one waveguide 25. In some examples, the couplers 40*a* and 40*b* may direct light coupled out of the at least one waveguide 25 to one or more optical absorbers configured to absorb light.

In some cases, at least one of the optical couplers 20*a*, 20*b*, 40*a* and 40*b* may comprise a resonant optical filter (or resonant optical coupler) configured to couple light having the first wavelength or the second wavelength into or out of the at least one waveguide 25. In some examples, the resonant optical filters each may comprise a microring resonator.

Figure 1B:
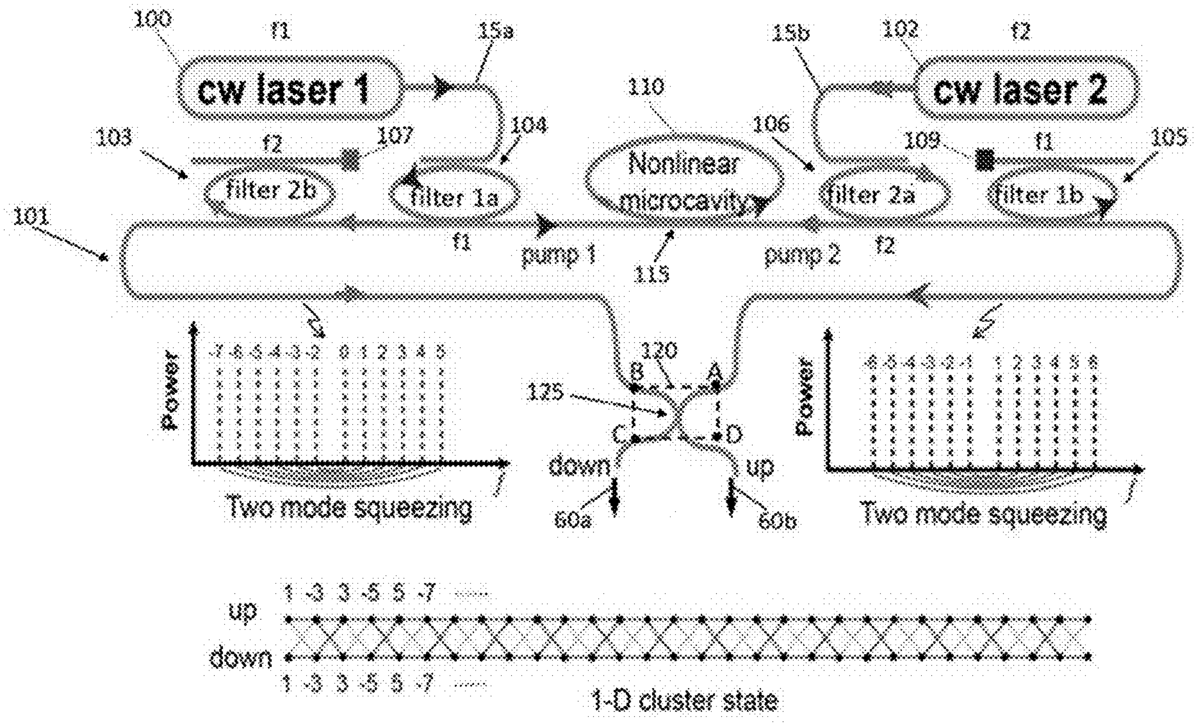
FIG. 1B illustrates an example quantum optical device based on the design shown in FIG. 1A.

One example of the quantum optical device configuration 10 is depicted in FIG. 1B. The device includes continuous-wave (CW) lasers 100 and 102, optical waveguide 101, an optical microresonator or a resonant microcavity 110, optical filters 103, 104, 105 and 106, and output optical coupler 120. In some embodiments, the output optical coupler 120 may comprise a directional optical coupler 125 configured to receive light from the waveguide 101 from a first input port A and a second input port B. In some cases, the optical filters 103, 104, 105 and 106 may comprise resonant optical filters (e.g., microring based drop filters). It should be noted that lasers 100 and 102 may be physically distinct lasers (e.g., with distinct cavities and/or distinct optical amplifiers) or may be derived from a common optical source (e.g., a common laser). If the latter, for example, laser 100 may represent the first output of the common optical source and laser 102 may represent the second output of the common optical source. In some cases, one of the outputs may pass through an optical frequency shifter (e.g., an electro-optical or an acousto-optical modulator) configured to shift the frequency (or wavelength) of the output relative to the other output. In some cases, having lasers derived from a common optical source may increase the coherence of the output light relative to the case where physically distinct lasers are used. In some cases, the microresonator or the resonant microcavity 110 may be a nonlinear microresonator or microcavity having a large nonlinear optical coefficient (e.g., a microcavity cavity comprising a nonlinear optical material having a large nonlinear optical coefficient). In some cases, the nonlinear optical material may comprise a material having a non-zero third-order nonlinear optical susceptibility, $\chi^{(3)}$, and/or a non-zero second-order nonlinear optical susceptibility, $\chi^{(2)}$, to support a parametric optical process. In some examples, the nonlinear optical material can have a Kerr nonlinear coefficient (or third-order nonlinear optical susceptibility, $\chi^{(3)}$ larger than $10^{-20}$ m$^2$/W. In some cases, the nonlinear microresonator or microcavity 110 can be a microresonator having a quality factor larger than $10^3$, $10^4$, $10^5$, $10^6$, $10^7$, $10^8$, $10^9$, or larger values. In some cases, microcavity 110 may be configured to produce or support four-wave mixing (FWM), or other nonlinear optical effects. In some examples, laser 100 is configured to emit light at a first wavelength and laser 102 is configured to emit light at a second wavelength, different from the first wavelength. The wavelengths may be, for example, in the C-band. In some embodiments the Waveguide 101 can be evanescently coupled the microcavity 110 (e.g., microresonator, or ring resonator) via a single coupling junction 115. In some embodiments the Waveguide 101 can be coupled (e.g., evanescently coupled) to the microcavity 110, and can be arranged to couple the light emitted by laser 100 (light having the first wavelength) to the microcavity in accordance with a first propagation direction and to couple the light emitted by laser 102 (light having the second wavelength) to the microcavity in accordance with a second propagation direction opposite the first propagation direction. As a result, in some cases, pump light having the first wavelength circulates as a clockwise propagating mode of the microcavity 110 and pump light having the second wavelength circulates as a counterclockwise propagating mode of the microcavity 110. In some examples, the clockwise propagating mode generates a first two-mode squeezed optical frequency comb and the counterclockwise propagating mode generates a second two-mode squeezed optical frequency comb. In some cases, the first and second two-mode squeezed optical frequency combs are coupled from the microcavity 110 to the waveguide 101 (that also serves as an output waveguide in the configuration shown in FIG. 1B) and are provided to the first and second ports A, B of the directional optical coupler 125. The spectrum of the two-mode squeezed optical frequency combs generated by the microcavity 110 are also shown in FIG. 1B. The directional optical coupler 125 outputs a portion of the first and the second two-mode squeezed optical frequency combs as a light beam via each of its output ports C, D. In some cases, light beams 60*a* and 60*b* output by the first and second output ports C and D of the output optical coupler 120 may comprise a CV cluster state (e.g., a dual-rail cluster state).

In some embodiments, resonant optical filter 104 couples or drops laser 100 to optical waveguide 101, and resonant optical filter 106 couples or drops laser 102 to optical waveguide 101. Additionally, in some cases, resonant optical filter 103 is also coupled to waveguide 101 and is tuned to the wavelength of the laser 102. In this way, filter 103 serves as a drop port for the light generated by the laser 102. In some cases, at least a portion of the light dropped from the waveguide 101 by the filter 103 may be absorbed by an optical absorber 107. Optical absorber 107 may prevent stray light (that may otherwise reflect and couple back to optical waveguide 101) via optical absorption. Similarly, resonant optical filter 105 is also coupled to waveguide 101, and is tuned to the wavelength of laser 100, thus serving as a drop port for the light generated by the laser 100. A portion of the light dropped from the waveguide 101 by the filter 105 may be absorbed by an absorber 109. Like optical absorber 107, optical absorber 109 may prevent light coupled out of the waveguide 101 via the filter 105 to be coupled back to the waveguide 101.

In some embodiments, the optical microresonator 110 and the output optical coupler 120 can be on-chip components. For example, the optical microresonator 110 and the output optical coupler 120 may be monolithically fabricated on a single chip (or substrate). The chip may further comprise the filters 103, 104, 105 and 106 and the waveguide 101. In some embodiments, the single chip may comprise a substrate and a waveguide layer disposed on the substrate. In some cases, the substrate and/or the waveguide layer may comprise silicon or silicon nitride. In some examples, the substrate may comprise a silicon wafer and the waveguide layer may comprise silicon nitride or silicon on a silicon dioxide. In some embodiments, lasers 100 and 102 are fabricated on one or more separate chips, which are coupled to the chip comprise the other components of FIG. 1B (e.g., via free-space optical links, photonic wire bonds, or optical fibers). Fabrication of at least some of the components of FIG. 1B (e.g., filters 103, 104, 105 and 106, waveguide 101, optical microresonator 110 and output optical coupler 120) may involve etching a material layer (e.g., silicon, silicon nitride, or silicon dioxide). However, implementations based on fiber-optic components are also possible.

Figure 1C:
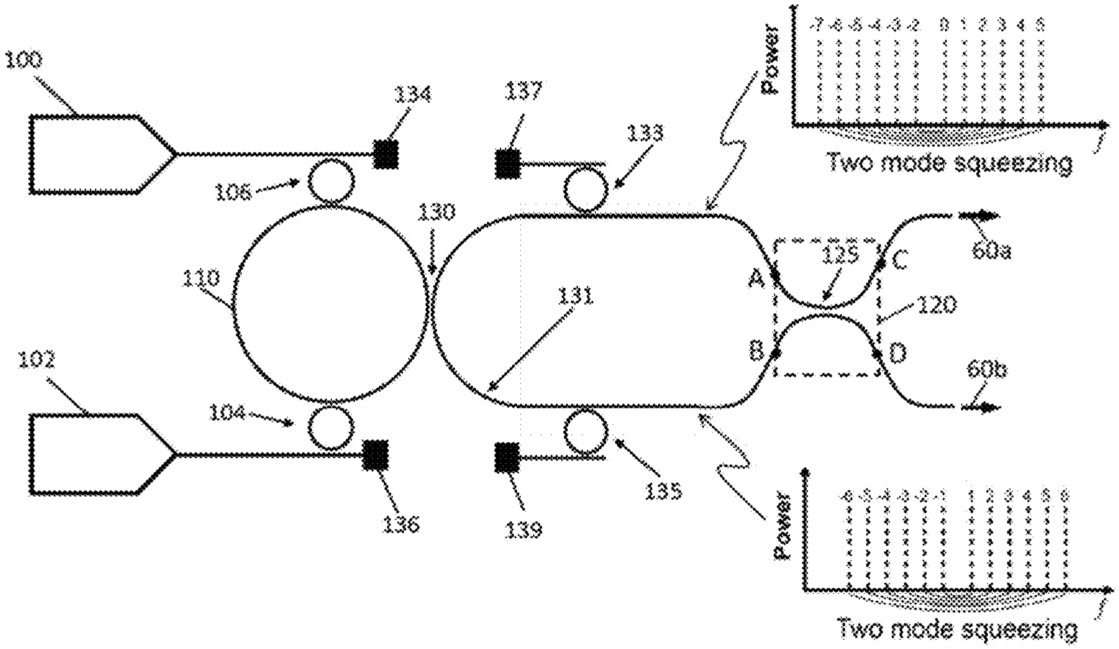
FIG. 1C illustrates another example quantum optical device based on the design shown in FIG. 1B.
Figure 1D:
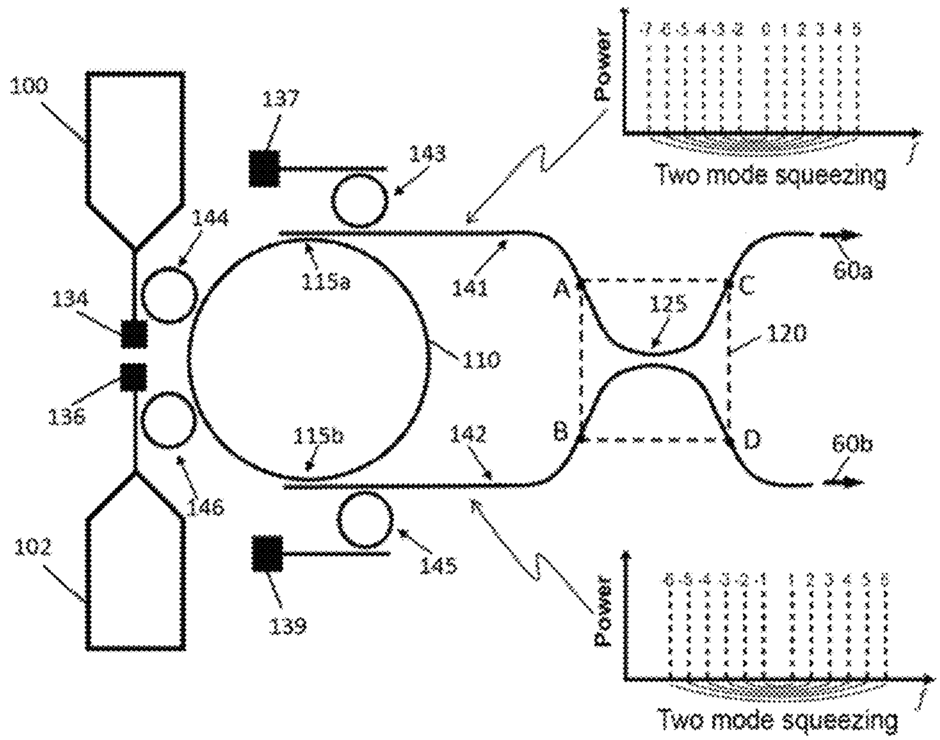
FIG. 1D illustrates another example quantum optical device based on the design shown in FIG. 1C.

FIGS. 1C-1D represent alternative quantum photonic device arrangements for cluster state generation based on counter-propagating optical modes in a microresonator. These arrangements operate largely in the same manner as described in connection with FIG. 1B. However, these arrangements differ from FIG. 1A in the way light is coupled from the lasers 100 and 102 to the optical microresonator 110 and/or in the way light is coupled from the optical microresonator 110 to the output optical coupler 120. As in the arrangement of FIG. 1B, the arrangements of FIGS. 1C-1D include CW lasers 100 and 102, an optical microresonator or a resonant microcavity 110, and an output optical coupler 120 (e.g., a directional optical coupler).

In the quantum photonic device arrangement of FIG. 1C, optical resonant filters 106 and 104 couple or drop laser light generated by the laser 102 and laser 100 to the microresonator 110. Resonant filters 106 and 104 may be tuned to the output wavelengths of the lasers—the first and second wavelength described above, respectively. In some embodiments, laser 100 may excite the clockwise mode of resonant filter 106 and laser 102 may excite the counterclockwise mode of resonant filter 104. In some cases, at least a portion of light that is not coupled to the microresonator 110 by the resonant filter 106 (e.g., light having a wavelength different from a resonant wavelength of the resonant filter 106), may be absorbed by an optical absorber 134 and a portion of light that is not coupled to the microresonator 110 by the resonant filter 104 (e.g., light having a wavelength different from a resonant wavelength of the resonant filter 104), may be absorbed by another optical absorber 136. In some cases, light coupled to the microresonator 110 via the resonant filter 106 may excite a counterclockwise mode of the microresonator 110 and light coupled to microresonator 110 via the resonant filter 104 may excite the clockwise mode of the microresonator 110. As described above, the counter-propagating modes give rise to a pair of frequency combs (e.g., via a non-linear optical interaction with the optical microresonator 110). In some embodiments, similar to the device shown in FIG. 1A, an optical waveguide 131 (e.g., a U-shape waveguide) may optically couples the microresonator 110 to the output optical coupler 120. In some examples, the optical waveguide 131 can be evanescently coupled to the microresonator 110 via a single coupling junction 130 such that the clockwise and counterclockwise modes propagating in the microresonator 110 can be coupled to the optical waveguide 131. For example, a first portion (the upper portion) of the optical waveguide 131 may couple the frequency comb resulting from the counterclockwise mode of microresonator 110 to a first input port A of the output optical coupler 120 and a second portion (the lower portion) of the optical waveguide 131 may couple the frequency comb resulting from the clockwise mode of microresonator 110 to a second input port of the output optical coupler 120. The first and second portions of the optical waveguide 131 can meet at the coupling junction 130 where the waveguide 131 is evanescently coupled to the microresonator 110. In some embodiments, the output optical coupler 120 generates a cluster state (e.g., a 1D cluster state) similar to the example depicted in FIG. 1B and outputs the cluster state via the output port C, D, e.g., as two output optical beams 60*a*, 60*b*. In some examples, two additional resonant optical filters 133 and 135 (in conjunction with the respective absorbers 137, 139) may serve as drop ports for the first and second wavelengths to eliminate any residual laser light coupled to the waveguide 131.

The quantum photonic device arrangement of FIG. 1D, comprises and an optical resonant filter 144 that optically couples the laser 100 to the microresonator 110 and an optical resonant filter 146 that optically couples laser 102 to the microresonator 110. In some cases, resonant filters 144 and 146 may be tuned to the output wavelengths of the lasers 100 and 102 respectively. In some embodiments, light from the laser 100 may be coupled to the microresonator 110 via a counterclockwise mode of the resonant filter 144 and light from laser 102 may be coupled to the microresonator 110 via a clockwise mode of the resonant filter 146. In some cases, light coupled via resonant optical filter 144 may excite the clockwise mode of microresonator 110 and light coupled via resonant optical filter 146 may excite the counterclockwise mode of microresonator 110. In some cases, a portion of light that is not coupled via the resonant filter 144 (e.g., light having a wavelength different from a resonant wavelength of the resonant filter 144) may be absorbed by an absorber 134 and a portion of light that is not coupled to the resonant filter 146 (e.g., light having a wavelength different from a resonant wavelength of the resonant filter 146), may be absorbed by another absorber 136. Similar to quantum photonic devices described above with respect to FIGS. 1B and 1C, the counterpropagating modes within the optical microresonator 110 generate a pair of frequency combs. In some embodiments, a first optical waveguide 141 couples the frequency comb generated by the clockwise mode of microresonator 110 to a first input port A of the output optical coupler 120 via a first coupling junction 115*a*. In some embodiments, a second optical waveguide 142 couples the frequency comb generated by the counterclockwise mode of microresonator 110 to a second input port of the output optical coupler 120 via a second coupling junction 115*b*. As such in the device configuration shown in FIG. 1D, the two frequency combs are coupled to the two input ports A, B of the output coupler 120 (e., the directional optical coupler 125) via two distinct coupling junctions and two distinct optical waveguides. In some cases, the output optical coupler 120 may use the two frequency combs received from the microresonator 110 to generate a 1D cluster state and output the 1D cluster state via the output ports C, D, e.g., as two output light beams 60*a*, 60*b*. In some cases, the resonant filters 143 and 145 (in conjunction with the respective absorbers) serve as drop ports for light having the wavelengths of the lasers 100, 102. In some examples, two additional resonant optical filters 143 and 145 (in conjunction with the respective absorbers 137, 139) may serve as drop ports for the first and second wavelengths to eliminate any residual laser light coupled to the waveguide 131.

As described above, some embodiments relate to a photonic system for generating a continuous variable cluster state. In some embodiments, the photonic system may comprise an optical microresonator (e.g., microresonator 110) configured to generate light via at least one nonlinear optical effect. The photonic system may further include a first laser (e.g., laser 100) configured to emit light having a first wavelength and a second laser (e.g., laser 102) configured to emit light having a second wavelength. In some embodiments, a first optical structure may be configured to couple light emitted by the first laser to a first mode circulating inside the microresonator in a first direction to generate a first frequency comb and a second optical structure may be configured to couple light emitted by the second laser to a second mode circulating inside the microresonator in a second direction opposite to the first direction to generate a second frequency comb. In some examples, an output optical coupler (e.g., output optical coupler 120) may be configured to use the first and the second frequency combs to generate the continuous variable cluster state. In some embodiments, the first optical structure may comprise a first portion of an optical waveguide (e.g., optical waveguide 101 of FIGS. 1B-1C), and the second optical structure may comprise a second portion of the optical waveguide. In some cases, the first and second portions of the optical waveguide may be coupled to the output optical coupler. In some cases, the first optical structure may further comprise an optical resonant filter (e.g., resonant filter 104 of FIG. 1B) configured to couple the first laser to the first portion of the optical waveguide and the second optical structure may further comprise an optical resonant filter (e.g., resonant filter 106 of FIG. 1B) configured to couple the second laser to the first portion of the optical waveguide.

In other embodiments, the first optical structure may comprise a first optical resonant filter (e.g., filter 106 of FIG. 1C, or filter 144 of FIG. 1D) configured to evanescently couple the first laser via a first coupling junction to the microresonator and the second optical structure may comprise a second optical resonant filter (e.g., filter 104 of FIG. 1C, or filter 146 of FIG. 1D) configured to evanescently couple the first laser via a second coupling junction different from the first coupling junction.

In some embodiments, the first and second frequency combs may be transmitted to the output optical coupler via a first and second portions of a single output optical waveguide. In some such embodiments, the first optical structure may comprise a first portion of an optical waveguide, and the second optical structure comprises a second portion of the optical waveguide. The first optical structure may further comprise a first optical resonant filter coupling the first laser to the first portion of the optical waveguide and a second optical resonant filter coupling the second laser to the second portion of the optical waveguide.

In other embodiments, a first optical waveguide (e.g., 141 of FIG.) may be configured to convey the first frequency comb to the output optical coupler and a second optical waveguide (e.g., 142 of FIG. 1D) may be configured to convey the second frequency comb to the output optical coupler.

Figure 2A:
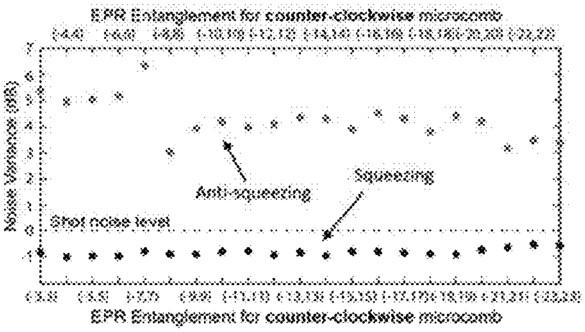
FIGS. 2A-2B illustrate noise variance for entangled pairs of frequency combs generated by a counterclockwise mode (A) and the corresponding clockwise mode of the optical microcavity used in the device shown in FIGS. 1A-1D.
Figure 2B:
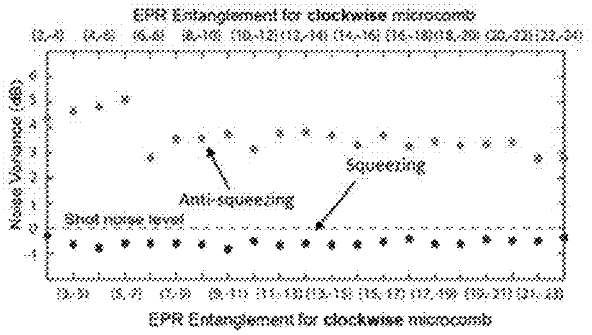

FIG. 2A illustrates the noise variance as a function of the EPR entanglement associated with the counterclockwise microcomb, and FIG. 2B illustrates the noise variance as a function of the EPR entanglement associated with the clockwise microcomb. In both combs, anti-squeezing samples are above the shot noise level whereas squeezing samples are below the shot noise level.

Referring back to FIG. 1B, coupler 120 couples the first portion of the optical waveguide with the second portion of the optical waveguide, thus causing the modes propagating in the opposite directions of the waveguide to interfere with each other, as described above. The first portion of the optical waveguide 101 may extend from the region where the optical waveguide couples to the optical microresonator 110 to a first input of coupler 120. Filters 103 and 104 may be coupled to the first portion of the optical waveguide. The second portion of the optical waveguide 101 may extend from the region where the optical waveguide couples to the optical microresonator 110 to a second input of coupler 120. Filters 105 and 106 may be coupled to the second portion of the optical waveguide. In the example illustrated in FIG. 1B, the first and second portions of the optical waveguide include U-turns (though other types of turns are also possible). The optical waveguide may be continuous in the region where the first portion meets the second portion. The resulting 1D cluster state is also shown in FIG. 1B. In one measurement, 23 two-mode squeezed pairs (EPR entanglement pairs) are measured for each direction, with about 1 dB raw squeezing achieved for this measurement. The measurement was obtained using balanced homodyne detection.

III. Non-Resonant Dual-Waveguide Configuration

The second approach involves generation of a cluster-state on a chip using highly nonlinear non-resonant waveguides. The non-resonant nature of the waveguides removes frequency misalignment that can occur due to mismatched FSRs of resonant structures. In some embodiments, the nonlinear waveguides may act as parametric amplifiers to generate two-mode squeezed photon pairs having a spectrum comprising a frequency comb. A waveguide may be pumped by a laser light or light beam that its frequency is offset (e.g., by an offset frequency $f_S$), relative to the frequency of a laser light or light beam that pumps another waveguide, to generate output fields (e.g., nonlinearly generated output fields also referred to as "nonlinear outputs") comprising two frequency combs. In some cases, when these two output fields, generated by different waveguides interfere (e.g., in a directional optical coupler), a frequency comb may be generated having frequencies components that can be expressed as $f_n = f_{pump} + n \times f_S$. In some cases, such frequency comb may comprise a 1-D cluster state. In some cases, the comb spacing of the frequency comb is defined by the pump laser frequency offset ($f_S$), and not by the geometrical properties of each waveguide structure. Therefore, this 1-D cluster state can be highly agile in the frequency domain and can be immune to structural variations (e.g., shape and dimension of the waveguides) due to fabrication tolerances.

In some embodiments, one or both waveguides may comprise a periodically poled region. For example, a waveguide region may comprise periodic poled lithium niobate (PPLN, Pockel effect) or AlGaAs (Kerr effect). When using PPLN for a parametric amplifier, the CW pump lasers may be frequency doubled to twice the frequency of the squeezing field to initiate the parametric down-conversion process.

Figure 3A:
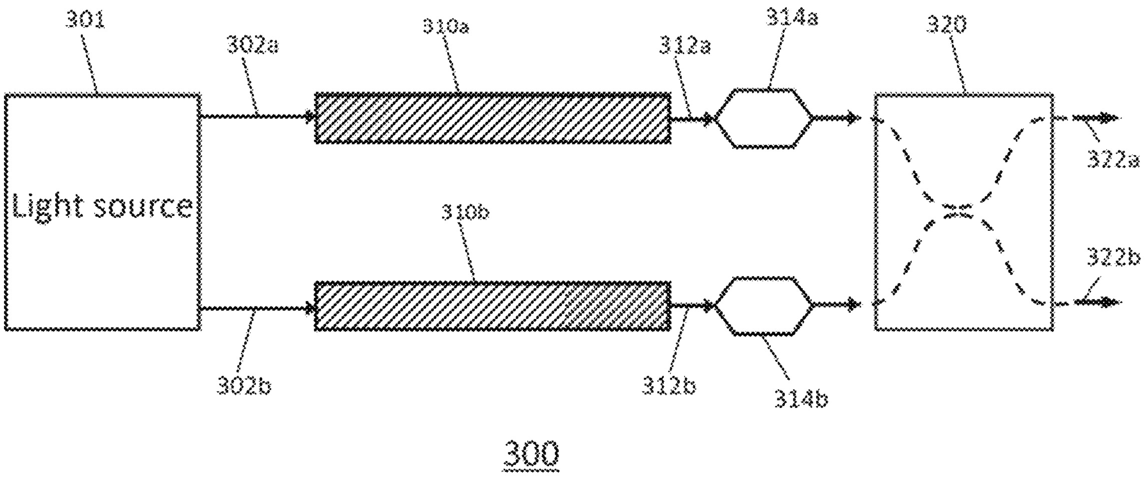
FIG. 3A is a diagram illustrating a quantum optical device configuration for generating a photonic CV cluster state using two individual parametric optical amplifiers.

FIG. 3A is a diagram illustrating a quantum optical device configuration 300 for generating a photonic CV cluster state using two individual parametric optical amplifiers (e.g., two on-chip optical amplifiers comprising optical waveguides). In some cases, quantum optical device configuration 300 can be a non-resonant dual-waveguide configuration comprising two optical waveguides 310*a*, 310*b* that do not support any longitudinal resonant optical modes. In some embodiments, the quantum optical device configuration 300 comprises a light source 12 that generates and outputs two pump light beams 302*a*, 302*b*, having different frequencies, two optical waveguides 310*a*, 310*b* that each receive one of the pump light beams 302*a*, 302*b* to generate and output a nonlinearly generated light beam, and an output optical coupler 320 (e.g., a direction optical coupler) that receives the two nonlinearly generated light beams 312*a*, 312*b* and outputs a portion of each nonlinearly generated light beams 312*a*, 312*b* from each of its two output ports. In some case the light beams 322*a*, 322*b* output by the first and second output ports of the output optical coupler 320 may comprise a quantum cluster state (e.g., a CV dual-rail cluster state). In some cases, the quantum optical device configuration 300 may comprise two additional optical elements 314*a*, 314*b* (e.g., two optical couplers or two optical filters), each configured to couple out (e.g., filter out or otherwise eliminate) at least a portion of pump light beam (e.g., an unconverted portion of pump light beam 302*a*, or 302*b*) received from one of the waveguides 310*a*, 310*b*. In some cases, the nonlinearly generated light may comprise light generated via a nonlinear optical interaction (e.g., a second or third order nonlinear optical interaction). In some examples, the nonlinear optical interaction can include a parametric optical process.

In some embodiments, at least a portion of the quantum optical device configuration 300 shown in FIG. 3A can be fabricated (e.g., monolithically fabricated) on a single chip or substrate. In some embodiments, at least waveguides 310*a*, 310*b* can be fabricated on a single chip or substrate. In some embodiments, the waveguides 310*a*, 310*b*, the couplers (or filters) 314*a*, 314*b*, and the output optical coupler 320 can be fabricated on a single chip or substrate. In some implementations, some components of the optical device configuration 300 may be fabricated on a first chip and some other components may be fabricated on a second chip where the first and the second chips are optically connected using free space optical arrangements (e.g., one or more lenses), optical fibers, or photonic wire bonds. For example, the light source 12 may be fabricated on a chip separate from another chip on which the waveguides 310*a*, 310*b*, the optical elements 314*a*, 314*b*, and the output optical coupler 320 are fabricated.

In one embodiment, pump light beams 302*a* and 302*b* generated by the light source 301 are provided to the waveguides 310*a*, 310*b* and each waveguide outputs nonlinearly generated light comprising two-mode squeezed entangled photon pairs. The nonlinearly generated light may comprise a frequency comb.

In some embodiments, the light source 12 may comprise a first laser that generates the first pump light 302*a* having a first frequency (or wavelength) and a second laser that generated the second pump light 302*b* having a second frequency (or wavelength). In some embodiments the first and the second lasers can be phase locked or otherwise configured to generate light beams having some degree of phase correlation. In some embodiments, the light source 12 may comprise a single laser that generate laser light having the first frequency and an optical frequency shifter configured to generate or derive light having the second frequency using the light having the first frequency. For example, a portion of the laser light may be output by the light source 12 as the first pump light 302*a*, and the second portion of the laser light may be provided to the optical frequency shifter that converts the second portion of the laser light to light having the second frequency and outputs the second pump light 302*b*.

In some embodiments, any one of the waveguides 310*a*, 310*b* may comprise a nonlinear optical material (e.g., a material having a large nonlinear optical coefficient). In some cases, the nonlinear optical material may comprise a material having a non-zero third-order nonlinear optical susceptibility, $\chi^{(3)}$, and/or a non-zero second-order nonlinear optical susceptibility, $\chi^{(2)}$, to support a parametric optical process. In some examples, the nonlinear optical material can have a Kerr nonlinear coefficient (or third-order nonlinear optical susceptibility, $\chi^{(3)}$ larger than $10^{-20}$ $m^2/W$. In some embodiments, any one of the waveguides 310*a*, 310*b* may comprise a structure, a refractive index variation, or a variation of material properties, configured to provide or enhance production of nonlinearly generated light within the waveguide.

In some cases, the variation of refractive index or material properties can be periodic. In some cases, the spectrum of the nonlinearly generated light may comprise a frequency comb. In some cases, the nonlinearly generated light may comprise a plurality of entangled photon pairs (e.g., EPR pairs) having different frequencies. In some such cases, a quantum state of an entangled photon pair of the plurality of entangled photon pairs may comprise a two-mode squeezed state.

Figure 4:
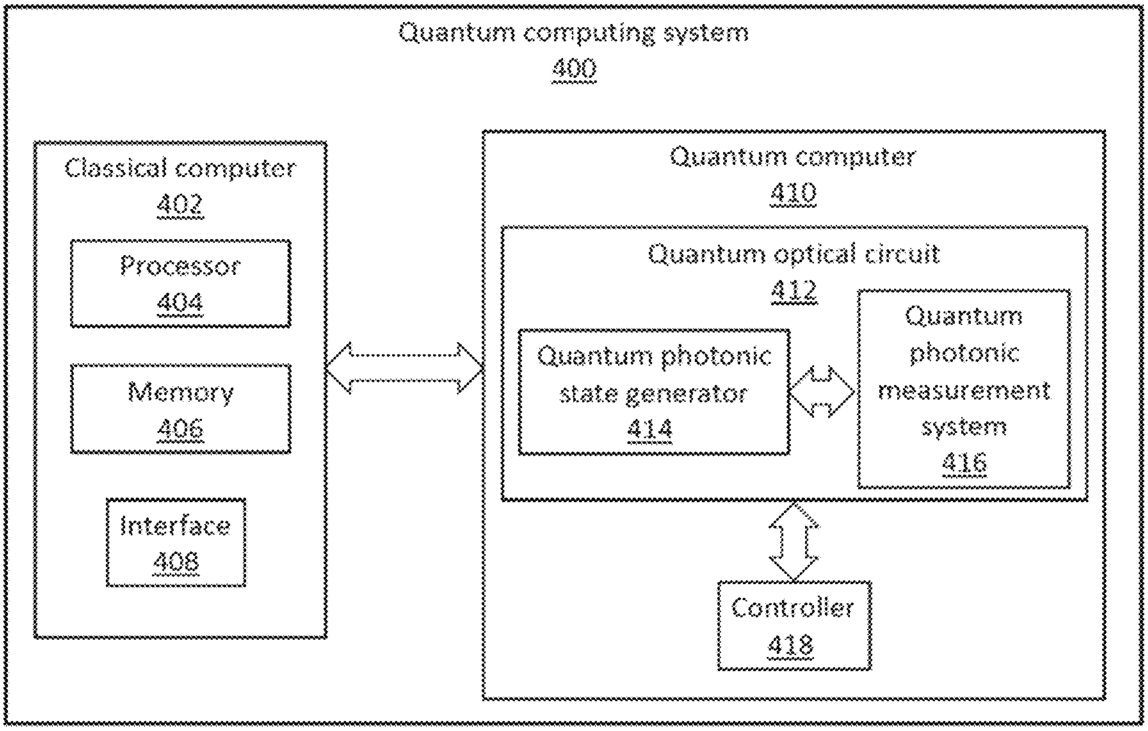
FIG. 4 illustrates an example of the quantum computing system that can use the quantum optical device configurations shown in FIGS. 1A and 3A to generate a CV cluster state for performing a quantum computational task.

FIG. 4 illustrates an example of the quantum computing system that can use the quantum optical device configurations shown in FIGS. 1A and 3A to generate a CV cluster state for performing a quantum computational task.

Figure 3B:
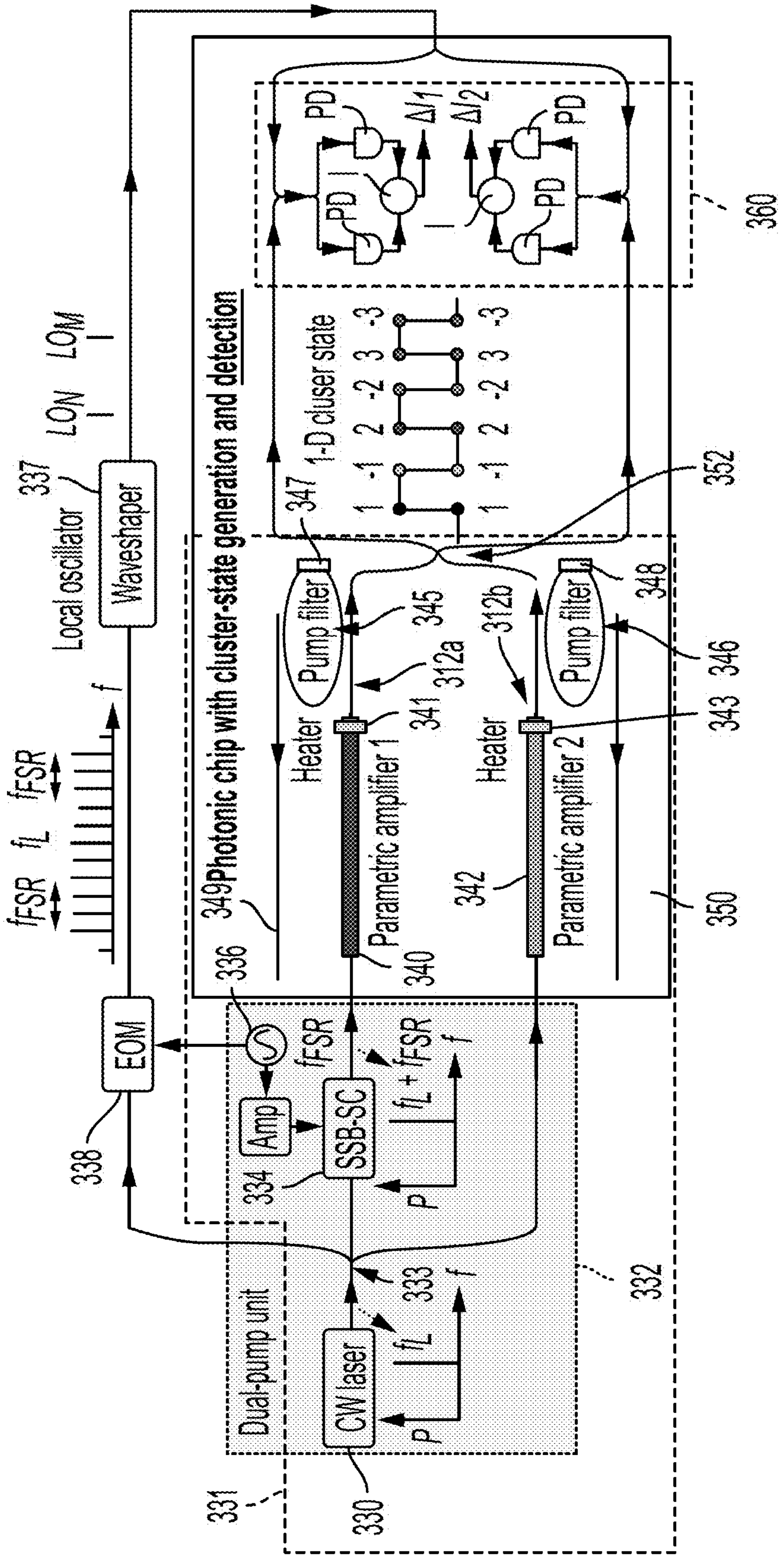
FIG. 3B illustrates an example of the quantum optical configuration based on the design shown in FIG. 3A.

One example implementation of the quantum optical device configuration 300 is depicted in FIG. 3B. The device includes a CW laser 330, an optical power divider 333, a single-sideband suppressed-carrier (SSB-SC) modulator 334 (although other devices for shifting the wavelength of the laser are also possible), two parametric optical amplifiers 340 and 342, two optical microresonators 345 and 346 (e.g., two ring resonators), optical waveguides 349 and 350, output coupler (e.g., a directional optical coupler) 352, a homodyne balanced detector 360, an oscillator 336 (e.g., an electronic RF oscillator), an electro-optical modulator (EOM) 338 and a waveshaper 337. In some embodiments, a signal path extends along the branches that include the parametric amplifiers, whereas a local oscillator (LO) path extends along the branch that includes waveshaper 337. In some implementations, the block identified by reference numeral 331 can include components that may be used for the generation of a cluster state and the components outside the block 331 represent a measurement system (e.g., a quantum measurement system) that is configured to detect light output by the output coupler 352 to measure the corresponding cluster state.

In some cases, the optical parametric amplifiers 340 and 342 may be embedded in respective optical waveguides, where the waveguides are non-resonant in nature (do not give rise to resonant modes). The parametric optical amplifiers 340 and 342 can be implemented using any suitable nonlinear medium (e.g., a medium having a large optical nonlinearity), including for example a nonlinear optical crystal. In some embodiments, the parametric optical amplifiers 342 and 340 are configured to generate light via a nonlinear optical process (e.g., four-wave mixing (FWM)), using pump light beams received from a dual-pump device 332 having a first wavelength and a second wavelength. In some embodiments, at least one of the parametric optical amplifiers may generate light via parametric down-conversion based on the Pockels effect. In some embodiments, the dual-pump device 332 may include at least the CW laser 330 and an optical frequency shifter (e.g., the single-sideband suppressed-carrier (SSB-SC) modulator 334). In some cases, the CW laser 330 may emit light at the first wavelength (e.g., in the C-band). In some cases, the optical power divider 333 couples a first portion of the light emitted by the laser 330 to the SSB-SC optical modulator 334 and a second portion of the light emitted by the laser 330 the parametric amplifier 342 (e.g., to the to the non-resonant waveguide in which the parametric amplifier 342 is embedded). In some cases, the SSB-SC modulator 334, which is optically coupled to the non-resonant waveguide in which parametric amplifier 340 is embedded, is configured to produce light at the second wavelength using the light emitted by the laser 330. Thus, the SSB-SC modulator 334 acts as a frequency shifter that shifts the frequency of the laser light produced by the laser 330 by a frequency shift (e.g., by $f_s$). In some cases, each parametric amplifier uses the corresponding pump light to generate light comprising a two-mode squeezed optical frequency comb. Notably, in these cases, the dual-pump device 332 uses a single laser (e.g., the CW laser 330) to provide pump light (e.g., two pump light beams) to the two parametric amplifiers 342, 340—as opposed to two separate lasers—which ensures mutual coherence. In some embodiments, the device may further include heaters 341 and 343 each thermally coupled one of the parametric optical amplifiers 340 and 342, respectively. In some examples, each heater can be configured to control the temperature of a portion of the corresponding optical waveguide, e.g., to locally adjust its refractive index. The amount of heat generated by the heaters 341 and 343 may be controlled by application of voltages on the heaters. In some embodiments, the heaters 341 and 343 may serve to tune the phase matching condition of the parametric optical amplifiers 342, 340. The extent to which the phase matching condition is shifted in a waveguide can depend on the amount of heat generated by the corresponding heater and provided to the waveguide (e.g., in accordance with the thermo-optic effect). It should be noted that other types of optical phase shifters may be used to control the optical phase matching condition in each waveguide, including phase shifters operating in accordance with electro-optic effects. In some embodiments, the heater 341 may be thermally isolated from the parametric optical amplifier 342 and the heater 343 may be thermally isolated from the parametric optical amplifier 340 to enable independent optical phase control of each parametric optical amplifier (e.g., by avoiding thermal crosstalk). Additionally, in some embodiments, the two parametric optical amplifiers 342, 340, can be thermally isolated.

The two optical microresonators 345 and 346 may be configured as resonant optical filters and may tuned to the wavelength at which the corresponding parametric amplifier is pumped to at least partially extract or eliminate light having the pump wavelengths. In some embodiments, the optical microresonators 345 and 346 (e.g., two ring resonators) can be configured to couple at least some portions of pump light output by the optical amplifiers 342, 340, to the optical waveguides 349 and 350, respectively (so that they are not transmitted to the output optical coupler 352). In some cases, two heating elements 347, 348, may be in thermal communication with the optical microresonators 345 and 346, respectively, to enable thermal control of their resonant frequencies. For example, the heating element 347 may be configured to tune a resonant frequency of the optical microresonator 346 to the first wavelength (wavelength of the pump light fed to the optical parametric amplifier 342), and the heating element 347 may be configured to tune a resonant frequency of the optical microresonator 345 to the second wavelength (wavelength of the pump light fed to the optical parametric amplifier 340).

Similar to the devices of FIGS. 1B-1C, in some cases, the device of FIG. 3B generates a cluster state based on the quantum interference of a pair of frequency combs. Parametric optical amplifiers 340 and 342 generate the pair of frequency combs (e.g., a first and a second frequency comb) that are offset relative to one another by the frequency difference between the pump wavelengths provided to the parametric optical amplifiers 340 and 342, e.g., by the frequency shift ($f_S$) provided by the SSB-SC modulator 334. In some examples, the cluster state may result from the quantum interference between the pair of frequency combs, which may be performed by output optical coupler 352 (e.g., a directional optical coupler). In some case, the output optical coupler 352 may couple the outputs of the parametric optical amplifiers 340 and 342 together to cause the optical fields, each comprising a two-mode squeezed optical frequency comb, to interfere with one another and generate a third frequency comb having frequencies expressed as $f_n = f_{pump} + n \times f_S$. In some cases, the optical fields associated with the frequency components of the third frequency comb forms a 1-D cluster state. In some embodiments, the optical field can be detected using a homodyne balanced detector 360, which beats the frequencies of the 1-D cluster state with the LO frequencies.

As described above in connection with FIGS. 1B-1D, at least some of the components of FIG. 3B can be on-chip components. For example, the optical power divider 333 and the optical coupler 352 (e.g., a directional optical coupler) may be monolithically fabricated on a single chip or substrate. However, implementations based on fiber-optic components are also possible.

In an alternative design for the second embodiment, the modulator 334 may shift the frequency of a portion of photons received from the laser 330 and transmit the frequency shifted and a portion of the original photons to a filter (a resonant add-drop filter) that sends the original photons to the second parametric optical amplifier 342 and the frequency shifted photons to the first parametric optical amplifier 340.

FIG. 4 illustrates an example of the quantum computing system 400 that can use the quantum photonic (optical) device configurations shown in FIGS. 1A and 3A, and the example quantum optical devices showing in FIGS. 1B-1D, and 3B to generate a CV cluster state for performing a quantum computational task. In some embodiments, the quantum computing system 400 can include a quantum computer 410 and a classical computer 402 in communication with the quantum computer 410. In some embodiments, the quantum computer 410 may comprise a quantum optical circuit 412 configured to perform a quantum computational task using a CV cluster state. In some examples, the quantum optical circuit 412 may comprise at least one quantum photonic state generator 414 configured to generate photons comprising at least one CV cluster state (e.g., a one-dimensional CV cluster state) and a quantum photonic measurement system 416 configured to perform measurements (e.g., quantum measurements) on the CV cluster state received from the quantum photonic state generator 414. In some cases, the quantum photonic state generator 414 may comprise a quantum photonic (optical) device implemented according to the configurations shown in FIGS. 1A and 3A. For example, the quantum photonic state generator 414 may include at least one of the quantum optical devices shown in FIGS. 1B-1D, or 3B. In some cases, the quantum photonic measurement system 416 may comprise one or more photodetectors configured to measure the photons (optical fields) generated by the quantum photonic state generator 414. In some examples, the quantum photonic measurement system 416 may include at least one balanced homodyne detector. For example, the quantum photonic measurement system 416 may comprise the balanced homodyne detector 360. In some cases, similar to the quantum optical device shown in FIG. 3B, the generated the quantum photonic state generator 414 may be integrated with the quantum photonic measurement system 416 on a common photonic chip. In some cases, the quantum computer 410 can include a controller 418 (e.g., a classical controller) configured to control the operation of the quantum photonic state generator 414 and the quantum photonic measurement system 416. In some examples, the controller 418 may comprise a non-transitory memory storing machine readable instructions and a hardware processor configured to execute the machine-readable instructions to control the operation of the quantum photonic state generator 414 and the quantum photonic measurement system 416. In some examples, the controller 418 may be in communication with the classical computer 402 to receive data and instructions for controlling the operation of the quantum photonic state generator 414 and the quantum photonic measurement system 416 and send measured data to the classical computer 402. In some cases, the classical computer 402 may comprise a non-transitory memory 406 storing machine-readable instructions and a hardware processor 404 configured to execute the machine-readable instructions to generate data (e.g., configuration data) and instructions for initiating and controlling the quantum photonic state generator 414 and the quantum photonic measurement system 416, and to process measured data generated by the quantum measurement system 416. In some embodiments, the classical computer 402 may comprise the controller 418 and directly communicate with the quantum photonic state generator 414 and the quantum photonic measurement system 416. In some embodiments, the classical computer 402 may compromise an interface 408 configured to receive instructions and data form another device or a user and provide data (e.g., processed data, quantum computation results) to the other device or the user. In some cases, the interface 408 can comprise a user interface or an electronic interface.

IV. Additional Embodiments

Some additional nonlimiting examples of embodiments discussed above are described below. These additional embodiments should not be read as limiting the breadth of the disclosure in any way.

In some embodiments, a quantum computing photonic device includes: a nonlinear optical resonant microcavity; a light source configured to emit light having a first wavelength and light having a second wavelength; and an optical waveguide coupled to the microcavity. The optical waveguide can be configured to couple the light having the first wavelength to a first optical mode of the microcavity propagating in a first propagation direction and to couple the light having the second wavelength to a second mode of the microcavity propagating in a second propagation direction opposite the first propagation direction. The device can further include an optical coupler configured to optically couple a first portion of the optical waveguide with a second portion of the optical waveguide.

In certain embodiments, the microcavity can have a free spectral range (FSR), and the first wavelength and the second wavelength can differ from one another by an integer multiple of the FSR.

In some embodiments, the device can further include: a first optical resonant filter coupling the first laser to the optical waveguide; and a second optical resonant filter coupling the second laser to the optical waveguide.

In certain embodiments, the device can further include: a third resonant filter, coupled to the optical waveguide and configured to couple the first wavelength out of the optical waveguide. In some embodiments, the device can include a fourth resonant filter, coupled to the optical waveguide and configured to couple the second wavelength out of the optical waveguide.

In some embodiments, the optical waveguide can be evanescently coupled to the microcavity. The microcavity can be configured to generate light via four wave mixing (FWM).

The light source can include a first laser configured to generate the light having the first wavelength and a second laser configured to generate the light having the second wavelength. The light having the first wavelength and the light having the second wavelength can be derived from a common optical source or from separate optical sources.

In certain embodiments, a photonic system generates a continuous variable cluster state. The photonic system can include: a microresonator configured to generate light via at least one nonlinear optical effect; a light source configured to generate light having a first wavelength and light having a second wavelength different from the first wavelength; and at least one optical waveguide. The optical waveguide can be configured to: couple the light having the first wavelength to a first mode circulating inside the microresonator in a first direction to generate a first frequency comb; and couple the light having a first wavelength to a second mode circulating inside the microresonator in a second direction opposite to the first direction to generate a second frequency comb. The system can further include an optical coupler configured to use the first and the second frequency combs to generate the continuous variable cluster state.

The optical coupler can generate the continuous variable cluster state by interfering the first and the second frequency combs. The first and the second frequency combs can each include a two-mode squeezed optical frequency comb. The at least one non-linear optical effect can include four wave mixing.

The at least one optical waveguide can couple the light having the first wavelength to the first mode circulating inside the microresonator via a first resonant filter and the light having the second wavelength to the second mode circulating inside the microresonator via a second resonant filter.

In some embodiments, the photonic system includes a third resonant filter configured to couple a portion of light emitted by the first laser to a first optical absorber and a fourth resonant filter configured to couple a portion of light emitted by the second laser to a second optical absorber.

The optical coupler can be a 50/50 coupler or another suitable coupler. In some embodiments, the optical coupler is an on-chip optical coupler. In certain embodiments, the optical coupler and the microresonator are monolithically fabricated on a single chip.

The optical microresonator can be an on-chip microresonator. In such embodiments where the optical coupler is an on-chip optical coupler, the optical coupler and the microresonator can be monolithically fabricated on a single chip or can be fabricated on separate chips.

Light having the first wavelength and light having the second wavelength can be derived from a common laser source or from separate sources. In certain embodiments, the light source can include a first laser source that generates the light having the first wavelength, and a second laser source that generates the light having the second wavelength is generated by a second laser source. A frequency difference between the light having the first wavelength and the light having the second wavelength can be substantially equal to an integer multiplied by a free-spectral-range (FSR) of the microresonator.

In some embodiments, a photonic system generates a continuous variable cluster state. The photonic system can include: a microresonator configured to generate light via at least one nonlinear optical effect; a first laser configured to emit light having a first wavelength; a second laser configured to emit light having a second wavelength; a first optical structure configured to couple light emitted by the first laser to a first mode circulating inside the microresonator in a first direction to generate a first frequency comb; a second optical structure configured to couple light emitted by the second laser to a second mode circulating inside the microresonator in a second direction opposite to the first direction to generate a second frequency comb; and a directional optical coupler configured to use the first and the second frequency combs to generate the continuous variable cluster state.

In certain embodiments, the first optical structure includes a first portion of an optical waveguide. In such embodiments, the second optical structure can include a second portion of the optical waveguide. The first and the second portions of the waveguide can extend from the microresonator to the optical coupler. The first and second portions of the optical waveguide can be optically connected to the directional optical coupler. The first optical structure can further include an optical resonant filter configured to couple the light having the first wavelength from the first laser to the first portion of the optical waveguide.

In some embodiments, the first optical structure includes a first optical resonant filter configured to couple the light having the first wavelength from the first laser to the microresonator. In such embodiments, the second optical structure can include a second optical resonant filter configured to couple light having the second wavelength from the second laser to the microresonator.

In certain embodiments, the photonic system can further include an optical waveguide coupled to the microresonator. A first portion of the optical waveguide can be coupled to the microresonator and can be configured to convey the first frequency comb to the directional optical coupler. A second portion of the optical waveguide can be configured to convey the second frequency comb to the optical coupler.

In some embodiments, the photonic system can further include a first optical waveguide configured to convey the first frequency comb to the directional optical coupler and a second optical waveguide configured to convey the second frequency comb to the optical coupler.

In certain embodiments, a quantum computing photonic device includes: a laser configured to emit light having a first wavelength; a first optical parametric amplifier including a first non-resonant waveguide; and a second optical parametric amplifier including a second non-resonant waveguide. An optical modulator can be optically connected to the first non-resonant waveguide. The optical modulator can be configured to produce light having a second wavelength using the light emitted by the laser. The quantum computing photonic device can include an optical power divider configured to couple a first portion of the light emitted by the laser to the optical modulator and to couple a second portion of the light emitted by the laser to the second non-resonant waveguide. The device can include a directional optical coupler configured to receive light from the first non-resonant waveguide and the second non-resonant waveguide.

In some embodiments, the optical modulator includes a single-sideband (SSB) modulator. The SSB modulator can be, for example, a single-sideband suppressed-carrier (SSB-SC) modulator.

In certain embodiments, the first optical parametric amplifier and the second optical parametric amplifier comprise nonlinear optical materials. The first optical parametric amplifier and the second optical parametric amplifier can be configured to generate light by four wave mixing (FWM) and/or parametric down-conversion.

In some embodiments, the device further includes a first resonant filter coupled between the first non-resonant waveguide and the directional optical coupler. The first resonant filter can be tuned to direct light having the first wavelength away from the directional optical coupler. A second resonant filter can be coupled between the second non-resonant waveguide and the directional optical coupler. The second resonant filter can be tuned to direct the light having the second wavelength away from the directional optical coupler.

In certain embodiments, a photonic system generates a continuous variable cluster state. The photonic system can include: a laser configured to emit light having a first frequency; an optical frequency shifter configured to receive a portion of light emitted by the laser and to generate light having a second frequency different from the first frequency; a first waveguide configured to use the light having the first frequency to generate a first optical output via a first nonlinear optical effect; a second waveguide configured to use the light having the second frequency to generate a second optical output via a second nonlinear optical effect; and a directional optical coupler configured to use the first and the second optical outputs to generate the continuous variable cluster state.

In some embodiments, the directional optical coupler generates the continuous variable cluster state by interfering the first and the second optical outputs. The first and the second optical outputs can include a first and a second optical frequency comb, respectively. In such embodiments, a first comb spacing of the first optical frequency comb can be substantially equal to a second comb spacing the second optical frequency comb. In certain such embodiments, a difference between the first frequency and the second frequency can be substantially equal to the first and the second comb spacings. In some such embodiments, the first and the second frequency combs can each comprise a two-mode squeezed optical frequency comb.

In certain embodiments, at least one of the first and the second non-linear optical effects can include four wave mixing. The first and the second waveguides can include at least one nonlinear optical material having a non-zero second-order or third-order nonlinear optical susceptibility. The first and the second waveguides can include at least one periodically poled region. At least one of the first and the second non-linear optical effects can include parametric down conversion.

In some embodiments, a photonic system generates a continuous variable cluster state. The photonic system can include: a microresonator configured to generate light via at least one nonlinear optical effect; a light source configured to generate light having a first wavelength and light having a second wavelength different from the first wavelength; a first optical coupler configured to couple the light having the first wavelength to a first mode circulating inside the microresonator in a first direction to generate a first frequency comb; a second optical coupler configured to couple the light having the second wavelength to a second mode circulating inside the microresonator in a second direction opposite to the first direction to generate a second frequency comb; and a directional optical coupler configured to use the first and the second frequency combs to generate the continuous variable cluster state.

In certain embodiments, the directional optical coupler generates the continuous variable cluster state by interfering the first and the second frequency combs. In such embodiments, the first and the second frequency combs can each include a two-mode squeezed optical frequency comb. At least one nonlinear optical effect can include four wave mixing. The first optical coupler can include a first resonant filter, and the second optical coupler can include a second resonant filter.

In some embodiments, the photonic system includes at least one waveguide configured to transmit the first and second frequency combs from the microresonator to a first input port and a second input port of the directional optical coupler, respectively. In such embodiments, the photonic system can include a third resonant filter configured to couple light having the first wavelength from the waveguide to a first optical absorber and a fourth resonant filter configured to couple light having the second wavelength from the waveguide to a second optical absorber.

In certain embodiments, the directional optical coupler can be a 50/50 coupler. The optical microresonator can be an on-chip microresonator. The directional optical coupler can also be an on-chip microresonator. In some embodiments, the directional optical coupler and the microresonator can be monolithically fabricated on a single chip.

In some embodiments, the light source can include a first laser source that generates the light having the wavelength. A second laser source can generate the light having the second wavelength. The light having the first wavelength and the light having the second wavelength can also be derived from a common laser source. A frequency difference between the light having the first wavelength and the light having the second wavelength can be substantially equal to an integer multiplied by a free-spectral-range of the microresonator.

In certain embodiments, a quantum photonic device is configured to generate light having a continuous variable (CV) cluster state. The quantum photonic device can include: an optical microresonator; at least one light source configured to generate light having a first wavelength and light having a second wavelength different from the first wavelength; at least one optical coupler configured to couple at least a portion of the light having the first wavelength to a first optical mode of the optical microresonator and at least a portion of the light having the second wavelength to a second optical mode of the optical microresonator; and a directional optical coupler configured to receive via at least one output waveguide a portion of nonlinearly generated light produced by the first optical mode and a portion of nonlinearly generated light produced by light in the second optical mode from the optical microresonator. The directional optical coupler can output the light having the CV cluster state.

In some embodiments, the CV cluster state can include a one-dimensional cluster state. The CV cluster state can include a dual-rail cluster state. In some embodiments, the optical microresonator includes a ring resonator. The optical microresonator can have a free spectral range (FSR), and the first wavelength and the second wavelength can differ from one another by an integer multiple of the FSR.

In certain embodiments, the at least one light source includes a first laser that generates the light having the first wavelength and a second laser that generates light having the second wavelength. The first optical mode can propagate in a first direction, and the second optical mode can propagate in a second direction different from the first direction inside the optical microresonator. In some such embodiments, the first direction can be clockwise, and the second direction can be counterclockwise.

In some embodiments, the at least one output waveguide can be evanescently coupled to the optical microresonator. The nonlinearly generated light produced by the light having the first wavelength can by processed by a first frequency comb, and the nonlinearly generated light produced by the light having the second wavelength can be processed by a second frequency comb. In such embodiments, the first and second frequency combs can each include a two-mode squeezed optical frequency comb.

In certain embodiments, the nonlinearly generated light produced by the light having the first wavelength can be generated via a nonlinear interaction between the optical microresonator and the portion of the light having the first wavelength coupled to the first optical mode, and the nonlinearly generated light produced by the light having the second wavelength can be generated via the nonlinear optical interaction between the optical microresonator and the portion of the light having the second wavelength coupled to the second optical mode In some such embodiments, the nonlinear optical interaction includes four-wave mixing.

In some embodiments, the optical microresonator includes an optical material having a third order nonlinearity. The at least one light source can include a single laser that generates the light having the first wavelength. In certain such embodiments, the light having the second wavelength can be derived from light having the first wavelength. For example, the at least one light source can include an optical frequency shifter configured to shift the frequency of the light having the first wavelength to generate the light having the second wavelength. In some such embodiments, the optical frequency shifter can include an acousto-optical modulator or an electro-optical modulator.

In certain embodiments, the optical microresonator, the at least one optical coupler, and the at least one output waveguide can be fabricated on a common substrate or chip. In some such embodiments, the directional optical coupler can also be fabricated on the common substrate or chip. In certain such embodiments, at least a portion of the at least one light source can also be fabricated on the common substrate or chip.

In some embodiments, the at least one optical coupler includes a first optical coupler configured to couple light having the first wavelength to the first optical mode and a second optical coupler configured to couple light having the second wavelength to the second optical mode. In certain such embodiments, the first optical coupler can include a first resonant optical filter, and the second optical coupler can include a second resonant optical filter. In some such embodiments, the first and the second resonant optical filters can each include a microring resonator.

In certain embodiments, at least one output waveguide includes a single output waveguide evanescently coupled to the optical microresonator via a single coupling junction. In some such embodiments, the at least one optical coupler can be configured to couple the light having the first wavelength to the first optical mode of the optical microresonator via a first portion of the single output waveguide and to couple the light having the second wavelength to the second optical mode of the optical microresonator via a second portion of the single output waveguide. In certain such embodiments, the light having the first and the second wavelengths propagate in opposite directions in the first and second portions of the single output waveguide, respectively. In some such embodiments, the directional optical coupler receives the portion of nonlinearly generated light produced by the light having the first wavelength via the first portion of the single output waveguide and receives the portion of nonlinearly generated light produced by the light having the second wavelength via the second portion of the single output waveguide. In certain such embodiments, the device can include a first optical filter configured to couple light having the first wavelength out of the first portion of the at least one output waveguide and a second optical filter configured to couple light having the second wavelength out of the second portion of the at least one output waveguide. The first and second optical couplers can be evanescently coupled to the optical microresonator via two separate waveguides and two distinct coupling junctions. At least one output waveguide can include a single output waveguide evanescently coupled to the optical microresonator via a single coupling junction different from the two distinct coupling junctions. The directional optical coupler can receive the portion of nonlinearly generated light produced by the light having the first and second wavelengths via a first portion and a second portion of the single output waveguide, respectively.

In some embodiments, the quantum photonic device can include a first optical filter configured to couple light having the first wavelength out of the first portion of the at least one output waveguide and a second optical filter configured to couple light having the second wavelength out of the second portion of the at least one output waveguide. The device can include a first output waveguide and a second output waveguide. The directional optical coupler can receive the portion of nonlinearly generated light produced by the light having the first wavelength via the first output waveguide and the portion of nonlinearly generated light produced by the light having the second wavelength via the second output waveguide. In certain such embodiments, the quantum photonic device can include a first optical filter configured to couple light having the first wavelength out of the first output waveguide and a second optical filter configured to couple light having the second wavelength out of the second output waveguide.

In certain embodiments, a quantum photonic device generates a continuous variable cluster state. The quantum photonic device can include at least one light source configured to generate light having a first frequency and light having a second frequency different from the first frequency; a first waveguide configured to use the light having the first frequency to generate a first optical output via a first nonlinear optical effect; a second waveguide configured to use the light having the second frequency to generate a second optical output via a second nonlinear optical effect; and a directional optical coupler configured to use first and the second optical outputs to generate the continuous variable cluster state.

In some embodiments, the at least one light source includes a first laser that generates the light having the first frequency and a second laser that generates the light having the second frequency. In other embodiments, the at least one light source comprises a single laser that generates the light having the first frequency and the light having the second frequency is derived from light having the first frequency. For example, the at least one light source can include an optical frequency shifter configured to shift the frequency of the light having the first frequency to generate the light having the second frequency. In some such embodiments, the optical frequency shifter includes an electro-optical modulator driven by an electronic oscillator.

In certain embodiments, the directional optical coupler generates the continuous variable cluster state by interfering the first and the second optical outputs. The first optical output can include a first optical frequency comb, and the second optical output can include a second optical frequency comb. In such embodiments, a first comb spacing of the first optical frequency comb can be substantially equal to a second comb spacing of the second optical frequency comb. In some such embodiments, a difference between the first frequency and the second frequency can be substantially equal to the first and the second comb spacings. In some such embodiments, the first and the second frequency combs each comprise a two-mode squeezed optical frequency comb.

In some embodiments, at least one of the first and the second nonlinear optical effects can include four wave mixing. At least one of the first and the second nonlinear optical effects can include parametric down conversion.

In certain embodiments, the first and the second waveguides include at least one nonlinear optical material. In some embodiments, the first and the second waveguides include at least one periodically poled region.

In some embodiments, the first and the second waveguides are fabricated on a chip. In such embodiments, the directional optical coupler can also be fabricated on the chip.

In certain embodiments, the quantum photonic device includes a first resonant filter coupled between the first waveguide and the directional optical coupler. The first resonant filter can be tuned to direct light having the first frequency away from the directional optical coupler. The quantum photonic device can include a second resonant filter coupled between the second waveguide and the directional optical coupler. The second resonant filter can be tuned to direct the light having the second frequency away from the directional optical coupler.

V. Mathematical Derivation

Figure 5A:
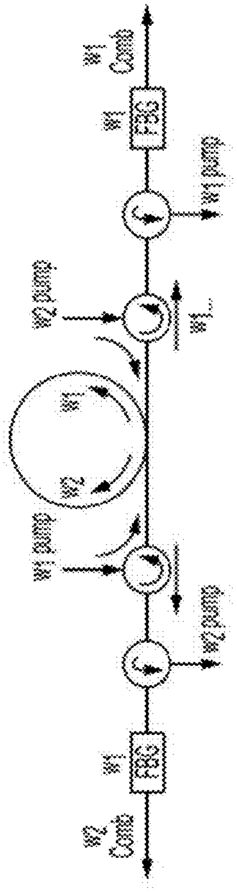
FIGS. 5A-5C are diagrams illustrating counter-propagating modes in resonant cavities.
Figure 5B:
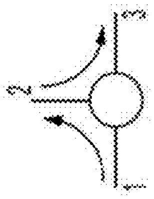
Figure 5C:
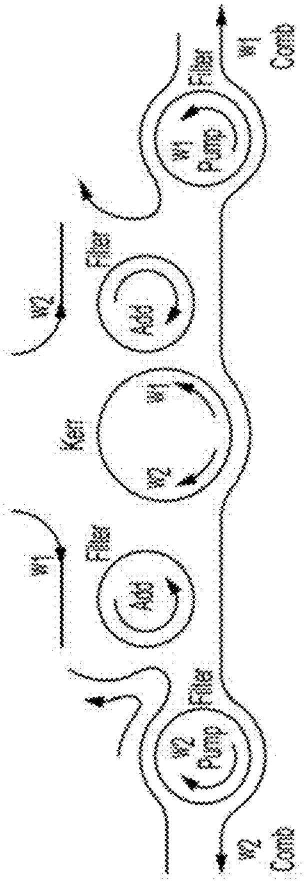
Figure 5D:
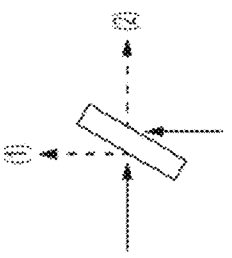
FIG. 5D is a diagram illustrating an optical splitter.

The following is a mathematical derivation relating to the counter-pumped microresonator configuration described in Section II of the present application:

$$H = i\hbar\left[k_z\sum_{k=n_z}^{N/2} a_k^{(z)t} a_{p_z-k}^{(z)c} + k_y\sum_{l=n_y}^{N/2} a_l^{(y)t} a_{p_y-l}^{(y)c}\right] + H.C.$$

where H represents the Hamiltonian, and H.C. indicates the Hermitian conjugate. As shown, two sets of Einstein-Podolsky-Rosen (EPR) pair OFC are created. By solving:

$$i\hbar\frac{d\hat{a}}{df} = [\hat{a}, \hat{H}],$$

one can get that the nullifiers are:

$$\left(Q_n^{(j)} - Q_{p_j-n}^{(j)}\right)e^{-r_j} \text{ and } \left(p_n^{(j)} - p_{p_j-n}^{(j)}\right)e^{-r_j}$$

where j=y or z and $p_j$ is the mode number being pumped by j. If counter-propagation pumping is occurring, then j=cw, ccw and the fields are separated into two fibers. This is illustrated in the examples of FIGS. 5A-5C, depicting counter-propagating modes in a resonant cavity. As further shown in FIG. 5D, two combs can then couple into a 50/50 splitter. In this case, the following relationship applies:

$$\frac{1}{\sqrt{2}}\begin{pmatrix} 1 & 1 \\ 1 & -1 \end{pmatrix} \text{ acts on } \begin{pmatrix} a_n^{(z)} \\ a_n^{(y)} \end{pmatrix}$$

and the output can be written as:

$$\begin{pmatrix} a_n^{(1)} \\ a^{(2)} \end{pmatrix} = \begin{pmatrix} \frac{1}{\sqrt{2}}\left(a_n^{(z)} + a_n^{(y)}\right) \\ \frac{1}{\sqrt{2}}\left(a_n^{(z)} - a_n^{(y)}\right) \end{pmatrix}$$

where:

$$Q_n^{(1)} = Q_n^{(z)} + Q_n^{(y)};\ p_n^{(1)} = p_n^{(z)} + p_n^{(y)}$$
$$Q_n^{(2)} = Q_n^{(z)} - Q_n^{(y)};\ p_n^{(2)} = p_n^{(z)} - p_n^{(y)}$$

In order to find the new nullifiers one applies $$\frac{da}{dt} \sim [a, H],$$

and finds the eigenmodes. For example, $$\left(Q_n^{(z)} - Q_{p_z-n}^{(z)}\right)e^{-rz}$$

is a nullifier. One can express $$Q_n^{(z)},\ Q_{p_z-n}^{(z)}$$

in terms of $$Q_{n'}^{(1)},\ Q_n^{(2)}$$

$$Q_n^{(z)} = Q_n^{(1)} + Q_n^{(2)};\ Q_{p_z-n}^{(z)} = Q_{p_z-n}^{(1)} + Q_{p_z-n}^{(2)}$$

from which one can derive the following expressions:

$$\left[Q_n^{(z)} - Q_{p_z-n}^{(z)}\right]e^{-rz} = \left[Q_n^{(1)} + Q_n^{(2)} - Q_{p_z-n}^{(1)} - Q_{p_z-n}^{(2)}\right]e^{-r} = \left[Q_n^{(1)} - Q_{p_z-n}^{(1)} + Q_n^{(2)} - Q_{p_z-n}^{(2)}\right]e^{-r}$$

Figure 5E:
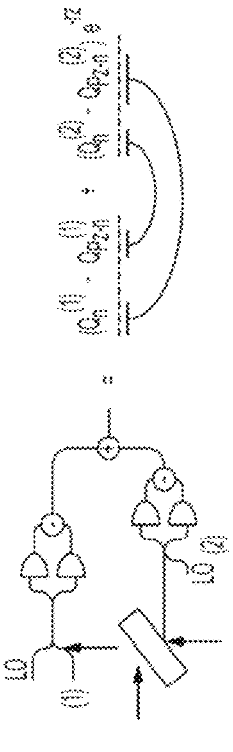
FIG. 5E is a diagram illustrating an optical combiner.
Figure 5F:
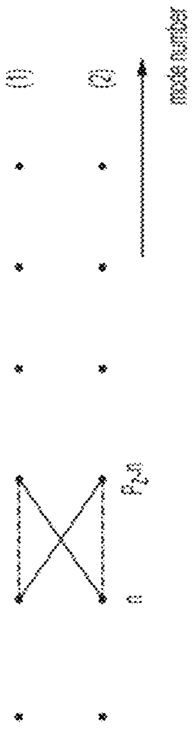
FIGS. 5F-5G are diagrams illustrating modes.

Measurements can be expressed as follows:

$$\left(Q_n^{(1)} - Q_{p_z-n}^{(1)}\right)e^{-rz}:$$

two-tone homodyne on path (1)

$$\left(Q_n^{(2)} - Q_{p_z-n}^{(2)}\right)e^{-rz}:$$

two-tone homodyne on path (2)

as can be appreciated from the combiner of FIG. 5E and the diagram of FIG. 5F. In sum, the four nullifiers can be expressed as follows:

$$Q_{n,p_z-n}^{(z)} = \left(Q_n^{(z)} - Q_{p_z-n}^{(z)}\right)e^{-rz};\ Q_{n,p_y-n}^{(y)} = \left(Q_n^{(y)} - Q_{p_y-n}^{(y)}\right)e^{-ry}$$
$$p_{n,p_z-n}^{(z)} = \left(p_n^{(z)} - p_{p_z-n}^{(z)}\right)e^{-rz};\ p_{n,p_y-n}^{(y)} = \left(p_n^{(y)} - p_{p_y-n}^{(y)}\right)e^{-ry}$$

by applying the following expressions, $$Q_n^{(1)} = Q_n^{(z)} + Q_n^{(y)};\ p_n^{(1)} = p_n^{(z)} + p_n^{(y)}$$
$$Q_n^{(2)} = Q_n^{(z)} - Q_n^{(y)};\ p_n^{(2)} = p_n^{(z)} - p_n^{(y)}$$

one obtains:

$$Q_n^{(z)} = Q_n^{(1)} + Q_n^{(2)};\ Q_n^{(y)} = Q_n^{(1)} - Q_n^{(2)};$$
$$p_n^{(z)} = p_n^{(1)} + p_n^{(2)};\ p_n^{(y)} = p_n^{(1)} - p_n^{(2)}$$

and $$Q_{n,p_z-n}^{(z)} = \left[Q_n^{(1)} + Q_n^{(2)} - \left(Q_{p_z-n}^{(1)} + Q_{p_z-n}^{(2)}\right)\right]e^{-rz} = \left(Q_n^{(1)} - Q_{p_z-n}^{(1)} + Q_n^{(2)} - Q_{p_z-n}^{(2)}\right)e^{-rz} \quad (1)$$

$$Q_{n,p_y-n}^{(y)} = \left[Q_n^{(1)} - Q_n^{(2)} - \left(Q_{p_y-n}^{(1)} - Q_{p_y-n}^{(2)}\right)\right]e^{-rz} = \left(Q_n^{(1)} - Q_{p_y-n}^{(1)} - \left(Q_n^{(2)} - Q_{p_y-n}^{(2)}\right)\right)e^{-rz} \quad (2)$$

$$p_{n,p_z-n}^{(z)} = \left[p_n^{(1)} + p_n^{(2)} + \left(p_{p_z-n}^{(1)} + p_{p_z-n}^{(2)}\right)\right]e^{-rz} = \left(p_n^{(1)} + p_{p_z-n}^{(I)} + p_n^{(2)} + p_{p_z-n}^{(2)}\right)e^{-rz}$$

$$p_{n,p_y-n}^{(y)} = \left[p_n^{(1)} - p_n^{(2)} + \left(p_{p_y-n}^{(1)} - p_{p_y-n}^{(2)}\right)\right]e^{-rz} = \left(p_n^{(1)} + p_{p_y-n}^{(1)} - p_n^{(2)} - p_{p_z-n}^{(2)}\right)e^{-rz} \quad (4)$$

which are measurable quadratures. To connect with the definition of cluster states, the cluster-state nullifier ca be expressed as:

$$\hat{N}_i = \hat{p}_i - \sum_{j \in N(i)} \hat{Q}_j;\ \hat{N}_i\,|\varphi\rangle = 0 \text{ (infinite amount of squeezing)}$$

where N (i) is the set of all nearby modes that are entangled with mode i. With reference to the numbering above:

$$(1)+(2)=2Q_n^{(1)}-Q_{p_z-n}^{(1)}-Q_{p_z-n}^{(2)}-Q_{p_y-n}^{(1)}+Q_{p_y-n}^{(2)}$$

and applying the Fourier transform $$\left(\frac{\lambda}{2}\text{ phase shift to mode } n,\ Q\rightarrow p\right),$$

the nullifier can be expressed as:

$$=p_n^{(1)}-\frac{1}{2}\left(Q_{p_z-n}^{(1)}+Q_{p_z-n}^{(2)}+Q_{p_y-n}^{(1)}-Q_{p_y-n}^{(2)}\right)$$

$$(1)-(2)=2Q_n^{(2)}-Q_{p_z-n}^{(1)}-Q_{p_z-n}^{(2)}-Q_{p_y-n}^{(2)}+Q_{p_y-n}^{(1)};$$

for $n$:

$$p_n^{(2)}-\frac{1}{2}\left(Q_{p_z-n}^{(1)}+Q_{p_z-n}^{(2)}+Q_{p_y-n}^{(2)}-Q_{p_y-n}^{(1)}\right)$$

Figure 5G:
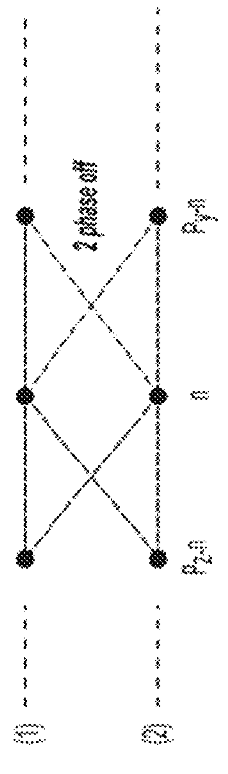

This is depicted in FIG. 5G. Applying the same analysis on (1) and (2), and taking the Fourier transform on mode (n):

$$\left[Q_n^{(1)}+Q_n^{(2)}-\left(Q_{p_z-n}^{(1)}+Q_{p_z-n}^{(2)}\right)\right]e^{-r_z}\rightarrow \quad (1)$$

$$\left[p_n^{(1)}-Q_{p_z-n}^{(1)}+p_n^{(2)}-Q_{p_z-n}^{(2)}\right]e^{-r}=$$

$$\left[p_n^{(1)}-\frac{1}{2}\left(Q_{p_z-n}^{(1)}+Q_{p_z-n}^{(2)}\right)+p_n^{(2)}-\frac{1}{2}\left(Q_{p_z-n}^{(2)}+Q_{p_z-n}^{(1)}\right)\right]e^{-r}$$

Measuring (1) produces the entanglement between mode n and $p_z$–n.

VI. Terminology

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±10% of a target value in some embodiments. The terms "approximately," "substantially," and "about" may include the target value.

Use of ordinal terms such as "first," "second," "third," etc., in the claims to modify a claim element does not by itself connotate any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A quantum photonic device configured to generate light comprising a continuous variable (CV) cluster state, the quantum photonic device comprising:

an optical microresonator;

a light source configured to generate light having a first wavelength and light having a second wavelength different from the first wavelength;

an optical coupler configured to couple at least a portion of the light having the first wavelength to a first optical mode of the optical microresonator and at least a portion of the light having the second wavelength to a second optical mode of the optical microresonator; and a directional optical coupler configured to receive from the optical microresonator, via an output waveguide:

a portion of nonlinearly generated light produced by the first optical mode, wherein the nonlinearly generated light produced by the first optical mode comprises a first frequency comb; and a portion of nonlinearly generated light produced by the second optical mode, wherein the nonlinearly generated light produced by the second optical mode comprises a second frequency comb, wherein the first and second frequency combs share a substantially same frequency spacing;

wherein the directional optical coupler is configured to output the light comprising the CV cluster state.

2. The quantum photonic device of claim 1, wherein the CV cluster state comprises a one-dimensional cluster state.

3. The quantum photonic device of claim 1, wherein the optical microresonator comprises a ring resonator.

4. The quantum photonic device of claim 1, wherein the optical microresonator has a free spectral range (FSR), and wherein the first wavelength and the second wavelength differ from one another by an integer multiple of the FSR.

5. The quantum photonic device of claim 1, wherein the first optical mode propagates in a first direction and the second optical mode propagates in a second direction different from the second direction inside the optical microresonator.

6. The quantum photonic device of claim 5, wherein the first direction is clockwise, and the second direction is counterclockwise.

7. The quantum photonic device of claim 1, wherein the output waveguide is evanescently coupled to the optical microresonator.

8. The quantum photonic device of claim 1, wherein the first and second frequency combs each comprise a two-mode squeezed optical frequency comb.

9. The quantum photonic device of claim 1, wherein the light source comprises a single laser that generates the light having the first wavelength and derives the light having the second wavelength from light having the first wavelength.

10. The quantum photonic device of claim 9, wherein the light source further comprises an optical frequency shifter configured to shift the frequency of the light having the first wavelength to generate the light having the second wavelength.

11. The quantum photonic device of claim 1, wherein the optical microresonator, the optical coupler, and the output waveguide are fabricated on a common substrate or chip.

12. The quantum photonic device of claim 11, wherein the directional optical coupler is fabricated on the common substrate or chip.

13. The quantum photonic device of claim 1, wherein the optical coupler comprises a first optical coupler configured to couple light having the first wavelength to the first optical mode and a second optical coupler configured to couple light having the second wavelength to the second optical mode.

14. The quantum photonic device of claim 13, wherein the first optical coupler comprises a first resonant optical filter and the second optical coupler comprises a second resonant optical filter.

15. The quantum photonic device of claim 13, wherein the first and second optical couplers are evanescently coupled to the optical microresonator via two separate waveguides and two distinct coupling junctions.

16. The quantum photonic device of claim 5, wherein the output waveguide comprises a single output waveguide evanescently coupled to the optical microresonator via a single coupling junction different from the two distinct coupling junctions, and wherein the directional optical coupler receives a portion of nonlinearly generated light produced by the light having the first wavelength via a first portion of the single output waveguide and via a second portion of the single output waveguide, respectively.

17. The quantum photonic device of claim 15, wherein the output waveguide comprises a first output waveguide and a second output waveguide, and wherein the directional optical coupler receives the portion of nonlinearly generated light produced by the light having the first wavelength via the first output waveguide and the portion of nonlinearly generated light produced by the light having the second wavelength via the second output waveguide.

18. The quantum photonic device of claim 1, wherein the output waveguide comprises a single output waveguide evanescently coupled to the optical microresonator via a single coupling junction.

19. The quantum photonic device of claim 16, further comprising a first optical filter configured to couple light having the first wavelength out of the first portion of the output waveguide and a second optical filter configured to couple light having the second wavelength out of the second portion of the output waveguide.

20. The quantum photonic device of claim 1, wherein the optical microresonator comprises a nonlinear material having a Kerr nonlinear coefficient larger than $10^{-20}$ $m^2/W$.

21. The quantum photonic device of claim 1, wherein the directional optical coupler is configured to generate the CV cluster state by causing quantum interference between first and second frequency combs so as to entangle modes of the first and second frequency combs.

22. The quantum photonic device of claim 1, wherein the first frequency comb is received by a first input port of the directional optical coupler, the second frequency comb is received by a second input port of the directional optical coupler, and the cluster state is output by first and second output ports of the directional coupler.

23. The quantum photonic device of claim 1, wherein the CV cluster state comprises a plurality of quantum modes, wherein each quantum mode is entangled with two of its neighbors.

24. The quantum photonic device of claim 1, wherein the light source and the directional optional coupler are on separate chips.

* * * * *